(12) United States Patent
Ammar et al.

(10) Patent No.:  US 12,619,982 B2
(45) Date of Patent:         May 5, 2026

(54) SINGLE-USE TOKENS

(71) Applicant: nChain Licensing AG, Zug (CH)

(72) Inventors: Bassem Ammar, London (GB); Wei Zhang, Zug (CH); Craig Steven Wright, Zug (CH)

(73) Assignee: nChain Licensing AG, Zug (CH)

( * ) Notice:  Subject to any disclaimer, the term of this patent is extended or adjusted under 35 U.S.C. 154(b) by 77 days.

(21) Appl. No.: 17/791,154

(22) PCT Filed: Dec. 7, 2020

(86) PCT No.: PCT/IB2020/061591
§ 371 (c)(1),
(2) Date: Jul. 6, 2022

(87) PCT Pub. No.: WO2021/140376
PCT Pub. Date: Jul. 15, 2021

(65) Prior Publication Data
US 2023/0036852 A1      Feb. 2, 2023

(30) Foreign Application Priority Data

Jan. 8, 2020    (GB) ..................................... 2000204

(51) Int. Cl.
*G06Q 20/38*         (2012.01)
*G06Q 20/40*         (2012.01)
(52) U.S. Cl.
CPC ..... *G06Q 20/385* (2013.01); *G06Q 20/38215* (2013.01); *G06Q 20/3825* (2013.01);
(Continued)
(58) Field of Classification Search
None
See application file for complete search history.

(56) References Cited

U.S. PATENT DOCUMENTS 9,858,781 B1 *   1/2018  Campero .............. H04L 9/3242
2018/0293573 A1 *  10/2018  Ortiz .................... G06Q 20/102
(Continued)

FOREIGN PATENT DOCUMENTS

JP          2018117287 A      7/2018
JP          2019095884 A      6/2019
(Continued)

OTHER PUBLICATIONS

Antonopoulos A. M., "Mastering Bitcoin," Jul. 21, 2017, pp. 55-115, Retrieved from the Internet: URL: https://www.oreilly.com/library/view/mastering-bitcoin-2nd/9781491954379/.
(Continued)

*Primary Examiner* — Patrick Mcatee
*Assistant Examiner* — Christine Dang
(74) *Attorney, Agent, or Firm* — Galvani Smith PLLC

(57)        ABSTRACT

A computer-implemented method of using blockchain transactions to issue one or more single-uses tokens for use by one or more respective token redeemers, wherein the method is performed by a token issuer and comprises: generating a token transaction, wherein the token transaction comprises: one or more token outputs, wherein each token output comprises token data representing a respective single-use token, wherein each single-use token is associated with a respective spendable output of the token transaction, and wherein a respective validity of each single-use token is conditional on the respective spendable output being present in an unspent transaction output set of a blockchain; and one or more inputs, wherein at least a first one of the inputs comprises a signature linked to a first public key of the token issuer; and transmitting the token transaction to one or more nodes of a blockchain network to be recorded in the blockchain.

14 Claims, 10 Drawing Sheets

(52) U.S. Cl.
CPC ..... *G06Q 20/3827* (2013.01); *G06Q 20/3829* (2013.01); *G06Q 20/389* (2013.01); *G06Q 20/407* (2013.01); *G06Q 2220/00* (2013.01)

(56) References Cited

U.S. PATENT DOCUMENTS

| | | | |
|---|---|---|---|
| 2019/0057362 A1 | 2/2019 | Wright et al. | |
| 2019/0164138 A1 | 5/2019 | Wright et al. | |
| 2019/0205894 A1* | 7/2019 | Gonzales, Jr. ........ | H04L 9/3247 |
| 2019/0220831 A1* | 7/2019 | Rangarajan .......... | H04L 9/3239 |
| 2019/0266601 A1 | 8/2019 | Allen | |
| 2020/0265516 A1* | 8/2020 | Xu ........................... | H04L 9/50 |
| 2020/0302470 A1* | 9/2020 | Walsh ................ | G06Q 30/0238 |

FOREIGN PATENT DOCUMENTS

| | | | | | |
|---|---|---|---|---|---|
| JP | 2019526120 A | 9/2019 | | | |
| JP | 2019528590 A | 10/2019 | | | |
| WO | WO-2017145003 A1 * | 8/2017 | ........ | G06F 16/1834 |
| WO | WO-2017178955 A1 * | 10/2017 | ............ | G06F 21/30 |
| WO | 2018020372 A1 | 2/2018 | | | |
| WO | WO-2018078584 A1 * | 5/2018 | ............ | G06F 16/27 |
| WO | 2019163040 A1 | 8/2019 | | | |

OTHER PUBLICATIONS

Charlon F., "Open Assets Protocol (OAP/1.0)," 2013, Retrieved from the Internet: URL: https://github.com/OpenAssets/open-assets-protocol/blob/master/specification.mediawiki, Retrieved on Dec. 4, 2019, 9 pages.

Combined Search and Examination Report for Application No. GB1913704.1, Jun. 23, 2020, 14 pages.

Combined Search and Examination Report for Application No. GB2000204.4, May 27, 2020, 5 pages.

Compliancy Group, "Gdpr Compliance and HIPAA: How to Address Both," Retrieved from the Internet: URL: https://compliancy-group.com/gdpr-compliance-hipaa-software/, on Dec. 4, 2019, 5 pages.

Github, "Bitcoin/Bips," Github, 2019, 15 pages, Retrieved from the Internet: URL: https://github.com/bitcoin/bips/blob/master/bip-0032.mediawiki, Retrieved on Dec. 4, 2019.

Github, "The Colored Coins Protocol," Retrieved from the Internet: URL:https://github.com/Colored-Coins/Colored-Coins-Protocol-Specification/, Retrieved on Dec. 4, 2019, 1 page.

hhs.gov, "Summary of the HIPAA Security Rule," Health Information Privacy, Retrieved from the Internet: URL: https://www.hhs.gov/hipaa/for-professionals/security/laws-regulations/index.html, on Dec. 4, 2019, 7 pages.

International Search Report and Written Opinion for International Application No. PCT/IB2020/061591, mailed on Feb. 22, 2021, 14 pages.

Nice, "Prescription Writing," Medicines Guidance, Retrieved from the Internet: URL: https://bnf.nice.org.uk/guidance/prescription-writing.html, Retrieved on Dec. 4, 2019, 4 pages.

Rouse M., "HIPAA (Health Insurance Portability and Accountability Act)," Retrieved from the Internet: URL: https://searchhealthit.techtarget.com/definition/HIPAA, Retrieved on Dec. 4, 2019, 6 pages.

Tokenized, "Documentation Menu," Tokenized Protocol, Retrieved from the Internet: URL: https://tokenized.com/docs/intro/preface, on Dec. 4, 2019, 3 pages.

Venkatesiah K., "GDPR Vs. HIPAA—Noting The Differences," Health IT Outcomes, Dec. 15, 2017, Retrieved from the Internet: URL: https://www.healthitoutcomes.com/doc/gdpr-vs-hipaa-noting-the-differences-0001, Retrieved on Dec. 4, 2019, 3 pages.

Wikipedia, "Electronic Prescribing," Retrieved from the Internet: URL: https://en.wikipedia.org/wiki/Electronic_prescribing, Retrieved on Dec. 4, 2019, 12 pages.

Wikipedia, "Medical Privacy," Retrieved from the Internet: URL: https://en.wikipedia.org/wiki/Medical_privacy, Retrieved on Dec. 4, 2019, 19 pages.

Wikipedia, "SCRIPT (Medicine)," Retrieved from the Internet: URL: https://en.wikipedia.org/wiki/SCRIPT_(medicine), Retrieved on Dec. 4, 2019, 1 page.

Antonopoulos., A M., "Bitcoin and Blockchain," NTT Publishing Co., Ltd, Jul. 21, 2016, pp. 95-102 and 130-145.

* cited by examiner

| Input(s) | Output(s) |
|---|---|
| $TxID_0$ || |

| Input(s) | Output(s) |
|---|---|
| Input | $UTXO_0$ |
| • Pointer to previous $Tx$ | • Amount |
| • Index of UTXO in previous $Tx$ | • Locking script locking to Alice |
| • Unlocking script for unlocking from previous party | |
| ⋮ | ⋮ |
| Optional further inputs | Optional further $UTXOs$ |
| ⋮ | ⋮ |

203

152j $Tx_1$    201    203

202

| Input(s) | Output(s) |
|---|---|
| $TxID_1$ || |

| Input(s) | Output(s) |
|---|---|
| Input | $UTXO_1$ |
| • Pointer to $Tx_0$ | • Amount |
| • Index of $UTXO_0$ [within $Tx_0$] | • Locking script locking to Bob |
| • Unlocking script for unlocking $UTXO_0$ from Alice | |
| ⋮ | ⋮ |
| Optional further inputs | Optional further $UTXOs$ |
| ⋮ | ⋮ |

Transaction
from Alice to Bob

Validated by running: Alice's
locking script (from output of $Tx_0$),
together with Alice's unlocking
script (as input to $Tx_1$). This checks
that $Tx_1$ meets the condition(s)
defined in Alice's locking script.

SINGLE-USE TOKENS

CROSS REFERENCE TO RELATED APPLICATIONS

This application is the U.S. National Stage of International Application No. PCT/162020/061591 filed on Dec. 7, 2020, which claims the benefit of United Kingdom Patent Application No. 2000204.4, filed on Jan. 8, 2020, the contents of which are incorporated herein by reference in their entireties.

TECHNICAL FIELD

The present disclosure relates to a method of using a blockchain to issue single-use tokens.

BACKGROUND

A blockchain refers to a form of distributed data structure, wherein a duplicate copy of the blockchain is maintained at each of a plurality of nodes in a peer-to-peer (P2P) network. The blockchain comprises a chain of blocks of data, wherein each block comprises one or more transactions. Each transaction may point back to a preceding transaction in a sequence which may span one or more blocks. Transactions can be submitted to the network to be included in new blocks by a process known as "mining", which involves each of a plurality of mining nodes competing to perform "proof-of-work", i.e. solving a cryptographic puzzle based on a pool of the pending transactions waiting to be included in blocks.

Conventionally the transactions in the blockchain are used to convey a digital asset, i.e. data acting as a store of value. However, a blockchain can also be exploited in order to lay additional functionality on top of the blockchain. For instance, blockchain protocols may allow for storage of additional user data in an output of a transaction. Modern blockchains are increasing the maximum data capacity that can be stored within a single transaction, enabling more complex data to be incorporated. For instance, this may be used to store an electronic document in the blockchain, or even audio or video data.

Each node in the network can have any one, two or all of three roles: forwarding, mining and storage. Forwarding nodes propagate transactions throughout the nodes of the network. Mining nodes perform the mining of transactions into blocks. Storage nodes each store their own copy of the mined blocks of the blockchain. In order to have a transaction recorded in the blockchain, a party sends the transaction to one of the nodes of the network to be propagated. Mining nodes which receive the transaction may race to mine the transaction into a new block. Each node is configured to respect the same node protocol, which will include one or more conditions for a transaction to be valid. Invalid transactions will not be propagated nor mined into blocks. Assuming the transaction is validated and thereby accepted onto the blockchain, the additional user data will thus remain stored at each of the nodes in the P2P network as an immutable public record.

SUMMARY

One of the fundamental features of some blockchain protocols is the double-spending protection. This security feature has been enduring real life testing for the last decade and is still unchallenged. One implication of the inability of double spending is the single use of any unspent output of a blockchain transaction. The present invention utilizes the single-use property of blockchain transaction outputs to enable the issuance of single-use tokens on the blockchain. The single-use tokens may be, for example, cinema tickets, gift cards, afternoon tea vouchers, flight tickets, and so on. Embodiments not only ensure that the tokens are single-use, but also provide for immutability, transparency, and auditability of records.

According to one aspect disclosed herein, there is provided a computer-implemented method of using blockchain transactions to issue one or more single-uses tokens for use by one or more respective token redeemers, wherein the method is performed by a token issuer and comprises: generating a token transaction, wherein the token transaction comprises: one or more token outputs, wherein each token output comprises token data representing a respective single-use token, wherein each single-use token is associated with a respective spendable output of the token transaction, and wherein a respective validity of each single-use token is conditional on the respective spendable output being present in an unspent transaction output set of a blockchain; and one or more inputs, wherein at least a first one of the inputs comprises a signature linked to a first public key of the token issuer; and transmitting the token transaction to one or more nodes of a blockchain network to be recorded in the blockchain.

A token output is an output of a blockchain transaction (the "token transaction") which comprises data representing a single-use token. A single-use token is a token which is valid for a single use only, e.g. the single-use token can be exchanged or redeemed for a given product (or set of products) or service only once. A single-use token cannot be re-used. Each single-use token is associated with (or linked with) a respective spendable output of the token transaction. A spendable output will remain in an unspent transaction output (UTXO) set of the blockchain until it is spent using a later blockchain transaction. If a spendable output of the token transaction is in the UTXO set, the associated single-use token is valid and can be used, e.g. redeemed for a product or service. If a spendable output of the token transaction is not in the UTXO set, the associated single-use token has been used (or revoked) and thus cannot be used.

According to another aspect disclosed herein, there is provided a token transaction for a blockchain, the token transaction comprising: one or more token outputs, wherein each token output comprises token data representing a respective single-use token, wherein each single-use token is associated with a respective spendable output of the token transaction, and wherein a respective validity of each single-use token is conditional on the respective spendable output being present in an unspent transaction output set of a blockchain; and one or more inputs, wherein at least a first one of the inputs comprises a signature linked to a first public key of a token issuer.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 2 schematically illustrates some examples of transactions which may be recorded in a blockchain;

DETAILED DESCRIPTION OF EMBODIMENTS

Example System Overview

Figure 1:
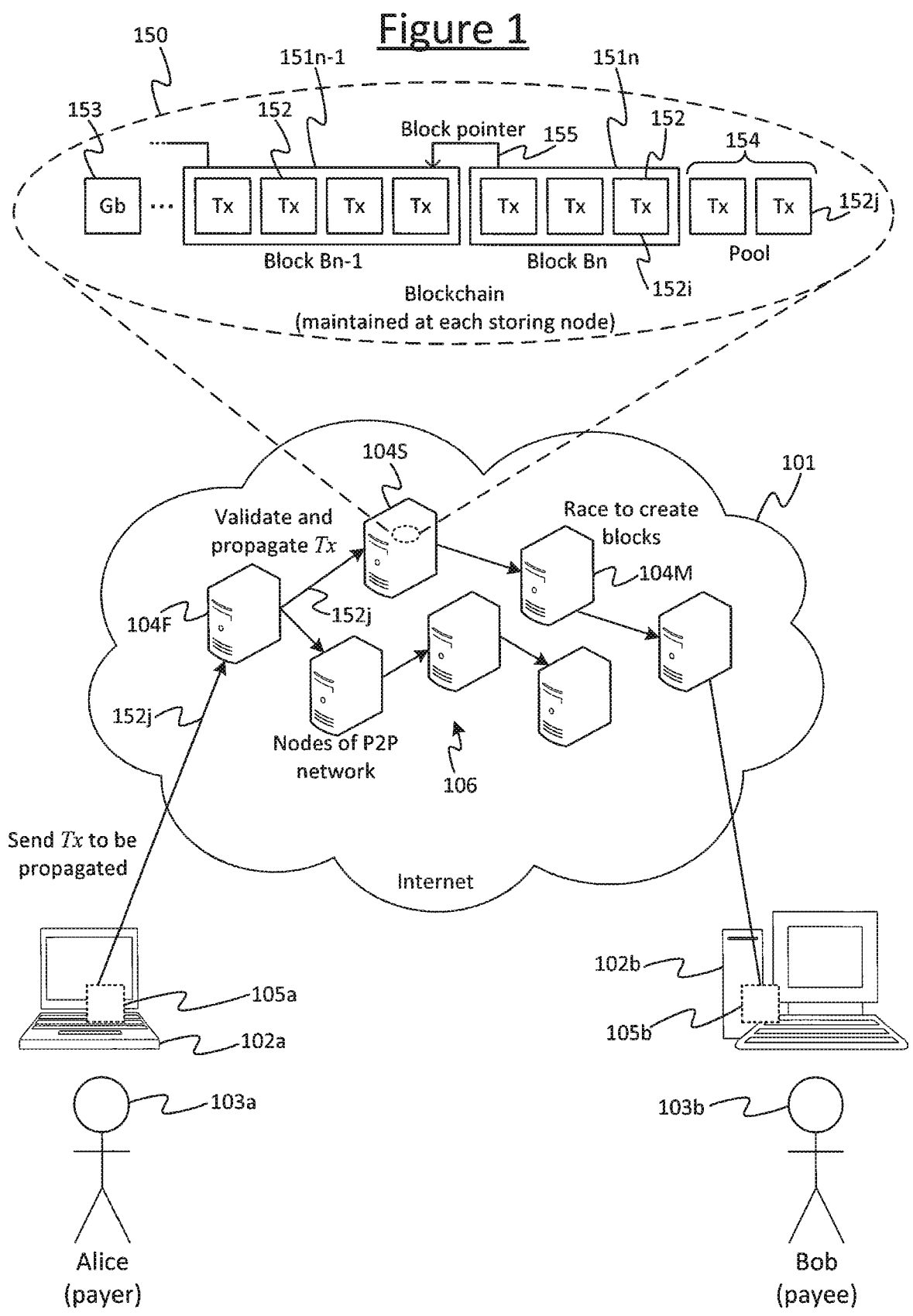
FIG. 1 is a schematic block diagram of a system for implementing a blockchain.

FIG. 1 shows an example system 100 for implementing a blockchain 150 generally. The system 100 comprises a packet-switched network 101, typically a wide-area inter-network such as the Internet. The packet-switched network 101 comprises a plurality of nodes 104 arranged to form a peer-to-peer (P2P) overlay network 106 within the packet-switched network 101. Each node 104 comprises computer equipment of a peers, with different ones of the nodes 104 belonging to different peers. Each node 104 comprises processing apparatus comprising one or more processors, e.g. one or more central processing units (CPUs), accelerator processors, application specific processors and/or field programmable gate arrays (FPGAs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of nodes in the P2P network 160. Each block 151 in the chain comprises one or more transactions 152, wherein a transaction in this context refers to a kind of data structure. The nature of the data structure will depend on the type of transaction protocol used as part of a transaction model or scheme. A given blockchain will typically use one particular transaction protocol throughout. In one common type of transaction protocol, the data structure of each standard transaction 152 comprises at least one input and at least one output. Each output specifies an amount representing a quantity of a digital asset belonging to a user 103 to whom the output is cryptographically locked (requiring a signature of that user in order to be unlocked and thereby redeemed or spent). Each input points back to the output of a preceding transaction 152, thereby linking the transactions.

At least some of the nodes 104 take on the role of forwarding nodes 104F which forward and thereby propagate transactions 152. At least some of the nodes 104 take on the role of miners 104M which mine blocks 151. At least some of the nodes 104 take on the role of storage nodes 104S (sometimes also called "full-copy" nodes), each of which stores a respective copy of the same blockchain 150 in their respective memory. Each miner node 104M also maintains a pool 154 of transactions 152 waiting to be mined into blocks 151. A given node 104 may be a forwarding node 104, miner 104M, storage node 104S or any combination of two or all of these.

In a given present transaction 152$j$, the (or each) input comprises a pointer referencing the output of a preceding transaction 152$i$ in the sequence of transactions, specifying that this output is to be redeemed or "spent" in the present transaction 152$j$. In general, the preceding transaction could be any transaction in the pool 154 or any block 151. The preceding transaction 152$i$ need not necessarily exist at the time the present transaction 152$j$ is created or even sent to the network 106, though the preceding transaction 152$i$ will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152$i$, 152$j$ be created or sent out-of-order (see discussion below on orphan transactions). The preceding transaction 152$i$ could equally be called the antecedent or predecessor transaction.

The input of the present transaction 152$j$ also comprises the signature of the user 103$a$ to whom the output of the preceding transaction 152$i$ is locked. In turn, the output of the present transaction 152$j$ can be cryptographically locked to a new user 103$b$. The present transaction 152$j$ can thus transfer the amount defined in the input of the preceding transaction 152$i$ to the new user 103$b$ as defined in the output of the present transaction 152$j$. In some cases a transaction 152 may have multiple outputs to split the input amount between multiple users (one of whom could be the original user 103$a$ in order to give change). In some cases a transaction can also have multiple inputs to gather together the amounts from multiple outputs of one or more preceding transactions, and redistribute to one or more outputs of the current transaction.

The above may be referred to as an "output-based" transaction protocol, sometimes also referred to as an unspent transaction output (UTXO) type protocol (where the outputs are referred to as UTXOs). A user's total balance is not defined in any one number stored in the blockchain, and instead the user needs a special "wallet" application 105 to collate the values of all the UTXOs of that user which are scattered throughout many different transactions 152 in the blockchain 151.

An alternative type of transaction protocol may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

With either type of transaction protocol, when a user 103 wishes to enact a new transaction 152$j$, then he/she sends the new transaction from his/her computer terminal 102 to one of the nodes 104 of the P2P network 106 (which nowadays are typically servers or data centres, but could in principle be other user terminals). This node 104 checks whether the transaction is valid according to a node protocol which is applied at each of the nodes 104. The details of the node protocol will correspond to the type of transaction protocol being used in the blockchain 150 in question, together forming the overall transaction model. The node protocol typically requires the node 104 to check that the cryptographic signature in the new transaction 152*j* matches the expected signature, which depends on the previous transaction 152*i* in an ordered sequence of transactions 152. In an output-based case, this may comprise checking that the cryptographic signature of the user included in the input of the new transaction 152*j* matches a condition defined in the output of the preceding transaction 152*i* which the new transaction spends, wherein this condition typically comprises at least checking that the cryptographic signature in the input of the new transaction 152*j* unlocks the output of the previous transaction 152*i* to which the input of the new transaction points. In some transaction protocols the condition may be at least partially defined by a custom script included in the input and/or output. Alternatively it could simply be a fixed by the node protocol alone, or it could be due to a combination of these. Either way, if the new transaction 152*j* is valid, the current node forwards it to one or more others of the nodes 104 in the P2P network 106. At least some of these nodes 104 also act as forwarding nodes 104F, applying the same test according to the same node protocol, and so forward the new transaction 152*j* on to one or more further nodes 104, and so forth. In this way the new transaction is propagated throughout the network of nodes 104.

In an output-based model, the definition of whether a given output (e.g. UTXO) is spent is whether it has yet been validly redeemed by the input of another, onward transaction 152*j* according to the node protocol. Another condition for a transaction to be valid is that the output of the preceding transition 152*i* which it attempts to spend or redeem has not already been spent/redeemed by another valid transaction. Again if not valid, the transaction 152*j* will not be propagated or recorded in the blockchain. This guards against double-spending whereby the spender tries to spend the output of the same transaction more than once. An account-based model on the other hand guards against double-spending by maintaining an account balance. Because again there is a defined order of transactions, the account balance has a single defined state at any one time.

In addition to validation, at least some of the nodes 104M also race to be the first to create blocks of transactions in a process known as mining, which is underpinned by "proof of work". At a mining node 104M, new transactions are added to a pool of valid transactions that have not yet appeared in a block. The miners then race to assemble a new valid block 151 of transactions 152 from the pool of transactions 154 by attempting to solve a cryptographic puzzle. Typically this comprises searching for a "nonce" value such that when the nonce is concatenated with the pool of transactions 154 and hashed, then the output of the hash meets a predetermined condition. E.g. the predetermined condition may be that the output of the hash has a certain predefined number of leading zeros. A property of a hash function is that it has an unpredictable output with respect to its input. Therefore this search can only be performed by brute force, thus consuming a substantive amount of processing resource at each node 104M that is trying to solve the puzzle.

The first miner node 104M to solve the puzzle announces this to the network 106, providing the solution as proof which can then be easily checked by the other nodes 104 in the network (once given the solution to a hash it is straightforward to check that it causes the output of the hash to meet the condition). The pool of transactions 154 for which the winner solved the puzzle then becomes recorded as a new block 151 in the blockchain 150 by at least some of the nodes 104 acting as storage nodes 104S, based on having checked the winner's announced solution at each such node. A block pointer 155 is also assigned to the new block 151*n* pointing back to the previously created block 151*n*-1 in the chain. The proof-of-work helps reduce the risk of double spending since it takes a large amount of effort to create a new block 151, and as any block containing a double spend is likely to be rejected by other nodes 104, mining nodes 104M are incentivised not to allow double spends to be included in their blocks. Once created, the block 151 cannot be modified since it is recognized and maintained at each of the storing nodes 104S in the P2P network 106 according to the same protocol. The block pointer 155 also imposes a sequential order to the blocks 151. Since the transactions 152 are recorded in the ordered blocks at each storage node 104S in a P2P network 106, this therefore provides an immutable public ledger of the transactions.

Note that different miners 104M racing to solve the puzzle at any given time may be doing so based on different snapshots of the unmined transaction pool 154 at any given time, depending on when they started searching for a solution. Whoever solves their respective puzzle first defines which transactions 152 are included in the next new block 151*n*, and the current pool 154 of unmined transactions is updated. The miners 104M then continue to race to create a block from the newly defined outstanding pool 154, and so forth. A protocol also exists for resolving any "fork" that may arise, which is where two miners 104M solve their puzzle within a very short time of one another such that a conflicting view of the blockchain gets propagated. In short, whichever prong of the fork grows the longest becomes the definitive blockchain 150.

In most blockchains the winning miner 104M is automatically rewarded with a special kind of new transaction which creates a new quantity of the digital asset out of nowhere (as opposed to normal transactions which transfer an amount of the digital asset from one user to another). Hence the winning node is said to have "mined" a quantity of the digital asset. This special type of transaction is sometime referred to as a "generation" transaction. It automatically forms part of the new block 151*n*. This reward gives an incentive for the miners 104M to participate in the proof-of-work race. Often a regular (non-generation) transaction 152 will also specify an additional transaction fee in one of its outputs, to further reward the winning miner 104M that created the block 151*n* in which that transaction was included.

Due to the computational resource involved in mining, typically at least each of the miner nodes 104M takes the form of a server comprising one or more physical server units, or even whole a data centre. Each forwarding node 104M and/or storage node 104S may also take the form of a server or data centre. However in principle any given node 104 could take the form of a user terminal or a group of user terminals networked together.

The memory of each node 104 stores software configured to run on the processing apparatus of the node 104 in order to perform its respective role or roles and handle transactions 152 in accordance with the node protocol. It will be understood that any action attributed herein to a node 104 may be performed by the software run on the processing apparatus of the respective computer equipment. Also, the term "blockchain" as used herein is a generic term that refers to the kind of technology in general, and does not limit to any particular proprietary blockchain, protocol or service.

Also connected to the network 101 is the computer equipment 102 of each of a plurality of parties 103 in the role of consuming users. These act as payers and payees in transactions but do not necessarily participate in mining or propagating transactions on behalf of other parties. They do not necessarily run the mining protocol. Two parties 103 and their respective equipment 102 are shown for illustrative purposes: a first party 103*a* and his/her respective computer equipment 102*a*, and a second party 103*b* and his/her respective computer equipment 102*b*. It will be understood that many more such parties 103 and their respective computer equipment 102 may be present and participating in the system, but for convenience they are not illustrated. Each party 103 may be an individual or an organization. Purely by way of illustration the first party 103*a* is referred to herein as Alice and the second party 103*b* is referred to as Bob, but it will be appreciated that this is not limiting and any reference herein to Alice or Bob may be replaced with "first party" and "second party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application or software 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective user party 103 to create, sign and send transactions 152 to be propagated throughout the network of nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

The instance of the client application 105 on each computer equipment 102 is operatively coupled to at least one of the forwarding nodes 104F of the P2P network 106. This enables the wallet function of the client 105 to send transactions 152 to the network 106. The client 105 is also able to contact one, some or all of the storage nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. Each node 104 runs software configured to validate transactions 152 according to a node protocol, and in the case of the forwarding nodes 104F to forward transactions 152 in order to propagate them throughout the network 106. The transaction protocol and node protocol correspond to one another, and a given transaction protocol goes with a given node protocol, together implementing a given transaction model. The same transaction protocol is used for all transactions 152 in the blockchain 150 (though the transaction protocol may allow different subtypes of transaction within it). The same node protocol is used by all the nodes 104 in the network 106 (though it many handle different subtypes of transaction differently in accordance with the rules defined for that subtype, and also different nodes may take on different roles and hence implement different corresponding aspects of the protocol).

As mentioned, the blockchain 150 comprises a chain of blocks 151, wherein each block 151 comprises a set of one or more transactions 152 that have been created by a proof-of-work process as discussed previously. Each block 151 also comprises a block pointer 155 pointing back to the previously created block 151 in the chain so as to define a sequential order to the blocks 151. The blockchain 150 also comprises a pool of valid transactions 154 waiting to be included in a new block by the proof-of-work process. Each transaction 152 (other than a generation transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

When a given party 103, say Alice, wishes to send a new transaction 152*j* to be included in the blockchain 150, then she formulates the new transaction in accordance with the relevant transaction protocol (using the wallet function in her client application 105). She then sends the transaction 152 from the client application 105 to one of the one or more forwarding nodes 104F to which she is connected. E.g. this could be the forwarding node 104F that is nearest or best connected to Alice's computer 102. When any given node 104 receives a new transaction 152*j*, it handles it in accordance with the node protocol and its respective role. This comprises first checking whether the newly received transaction 152*j* meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction $152j$ passes the test for being deemed valid (i.e. on condition that it is "validated"), any storage node 104S that receives the transaction $152j$ will add the new validated transaction 152 to the pool 154 in the copy of the blockchain 150 maintained at that node 104S. Further, any forwarding node 104F that receives the transaction $152j$ will propagate the validated transaction 152 onward to one or more other nodes 104 in the P2P network 106. Since each forwarding node 104F applies the same protocol, then assuming the transaction $152j$ is valid, this means it will soon be propagated throughout the whole P2P network 106.

Once admitted to the pool 154 in the copy of the blockchain 150 maintained at one or more storage nodes 104, then miner nodes 104M will start competing to solve the proof-of-work puzzle on the latest version of the pool 154 including the new transaction 152 (other miners 104M may still be trying to solve the puzzle based on the old view of the pool 154, but whoever gets there first will define where the next new block 151 ends and the new pool 154 starts, and eventually someone will solve the puzzle for a part of the pool 154 which includes Alice's transaction $152j$). Once the proof-of-work has been done for the pool 154 including the new transaction $152j$, it immutably becomes part of one of the blocks 151 in the blockchain 150. Each transaction 152 comprises a pointer back to an earlier transaction, so the order of the transactions is also immutably recorded.

Utxo-Based Model

FIG. 2 illustrates an example transaction protocol. This is an example of an UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO specifies an amount of a digital asset (a store of value). It may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners 104M.

Note that whilst each output in FIG. 2 is shown as a UTXO, a transaction may additionally or alternatively comprise one or more unspendable transaction outputs.

Say Alice 103$a$ wishes to create a transaction $152j$ transferring an amount of the digital asset in question to Bob 103$b$. In FIG. 2 Alice's new transaction $152j$ is labelled "$Tx_1$". It takes an amount of the digital asset that is locked to Alice in the output 203 of a preceding transaction $152i$ in the sequence, and transfers at least some of this to Bob. The preceding transaction $152i$ is labelled "$Tx_0$" in FIG. 2. $Tx_0$ and $Tx_1$ are just an arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in the blockchain 150 at the time when Alice creates her new transaction $Tx_1$, or at least by the time she sends it to the network 106. It may already have been included in one of the blocks 151 at that time, or it may be still waiting in the pool 154 in which case it will soon be included in a new block 151. Alternatively $Tx_0$ and $Tx_1$ could be created and sent to the network 102 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given node 104. Nevertheless, a subsequent transaction (the descendent transaction or "child") which points to a preceding transaction (the antecedent transaction or "parent") will not be validated until and unless the parent transaction is validated. A child that arrives at a node 104 before its parent is considered an orphan. It may be discarded or buffered for a certain time to wait for the parent, depending on the node protocol and/or miner behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script $<Sig\ P_A>$ which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

When the new transaction $Tx_1$ arrives at a node 104, the node applies the node protocol. This comprises running the locking script and unlocking script together to check whether the unlocking script meets the condition defined in the locking script (where this condition may comprise one or more criteria). In embodiments this involves concatenating the two scripts:

$$<Sig\ P_A>\|<P_A>[ChecksigP_A]$$

where "$\|$" represents a concatenation and "$< \ . . . >$" means place the data on the stack, and "$[ \ . . . ]$" is a function comprised by the unlocking script (in this example a stack-based language). Equivalently the scripts may be run one after another, with a common stack, rather than concatenating the scripts. Either way, when run together, the scripts use the public key $P_A$ of Alice, as included in the locking script in the output of $Tx_0$, to authenticate that the locking script in the input of $Tx_1$ contains the signature of Alice signing the expected portion of data. The expected portion of data itself (the "message") also needs to be included in $Tx_0$ order to perform this authentication. In embodiments the signed data comprises the whole of $Tx_0$ (so a separate element does to need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node 104 is able to authenticate that the encrypted version of the message must have been signed by Alice. Signing typically comprises hashing the message, signing the hash, and tagging this onto the clear version of the message as a signature, thus enabling any holder of the public key to authenticate the signature.

If the unlocking script in $Tx_1$ meets the one or more conditions specified in the locking script of $Tx_0$ (so in the example shown, if Alice's signature is provided in $Tx_1$ and authenticated), then the node 104 deems $Tx_1$ valid. If it is a mining node 104M, this means it will add it to the pool of transactions 154 awaiting proof-of-work. If it is a forwarding node 104F, it will forward the transaction $Tx_1$ to one or more other nodes 104 in the network 106, so that it will be propagated throughout the network. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the node 104 also needs to check whether the referenced UTXO in the preceding transaction $Tx_0$ is already spent (has already formed a valid input to another valid transaction). This is one reason why it is important for the blockchain 150 to impose a defined order on the transactions 152. In practice a given node 104 may maintain a separate database marking which UTXOs 203 in which transactions 152 have been spent, but ultimately what defines whether a UTXO has been spent is whether it has already formed a valid input to another valid transaction in the blockchain 150.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the winning miner, because nowadays the reward of the generation transaction alone is not typically sufficient to motivate mining. If Alice does not include a fee for the miner, $Tx_0$ will likely be rejected by the miner nodes 104M, and hence although technically valid, it will still not be propagated and included in the blockchain 150 (the miner protocol does not force miners 104M to accept transactions 152 if they don't want). In some protocols, the mining fee does not require its own separate output 203 (i.e. does not need a separate UTXO). Instead any different between the total amount pointed to by the input(s) 202 and the total amount of specified in the output(s) 203 of a given transaction 152 is automatically given to the winning miner 104. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference automatically goes to the winning miner 104M. Alternatively or additionally however, it is not necessarily excluded that a miner fee could be specified explicitly in its own one of the UTXOs 203 of the transaction 152.

Note also that if the total amount specified in all the outputs 203 of a given transaction 152 is greater than the total amount pointed to by all its inputs 202, this is another basis for invalidity in most transaction models. Therefore such transactions will not be propagated nor mined into blocks 151.

Alice and Bob's digital assets consist of the unspent UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the storage nodes 104S, e.g. the storage node 104S that is closest or best connected to the respective party's computer equipment 102.

Note that the script code is often represented schematically (i.e. not the exact language). For example, one may write $[ChecksigP_A]$ to mean $[ChecksigP_A]=OP\_DUP$ $OP\_HASH160<H(Pa)>$ $OP\_EQUALVERIFY$ $OP\_CHECKSIG$. "OP_. . . " refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain 150. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Figure 3:
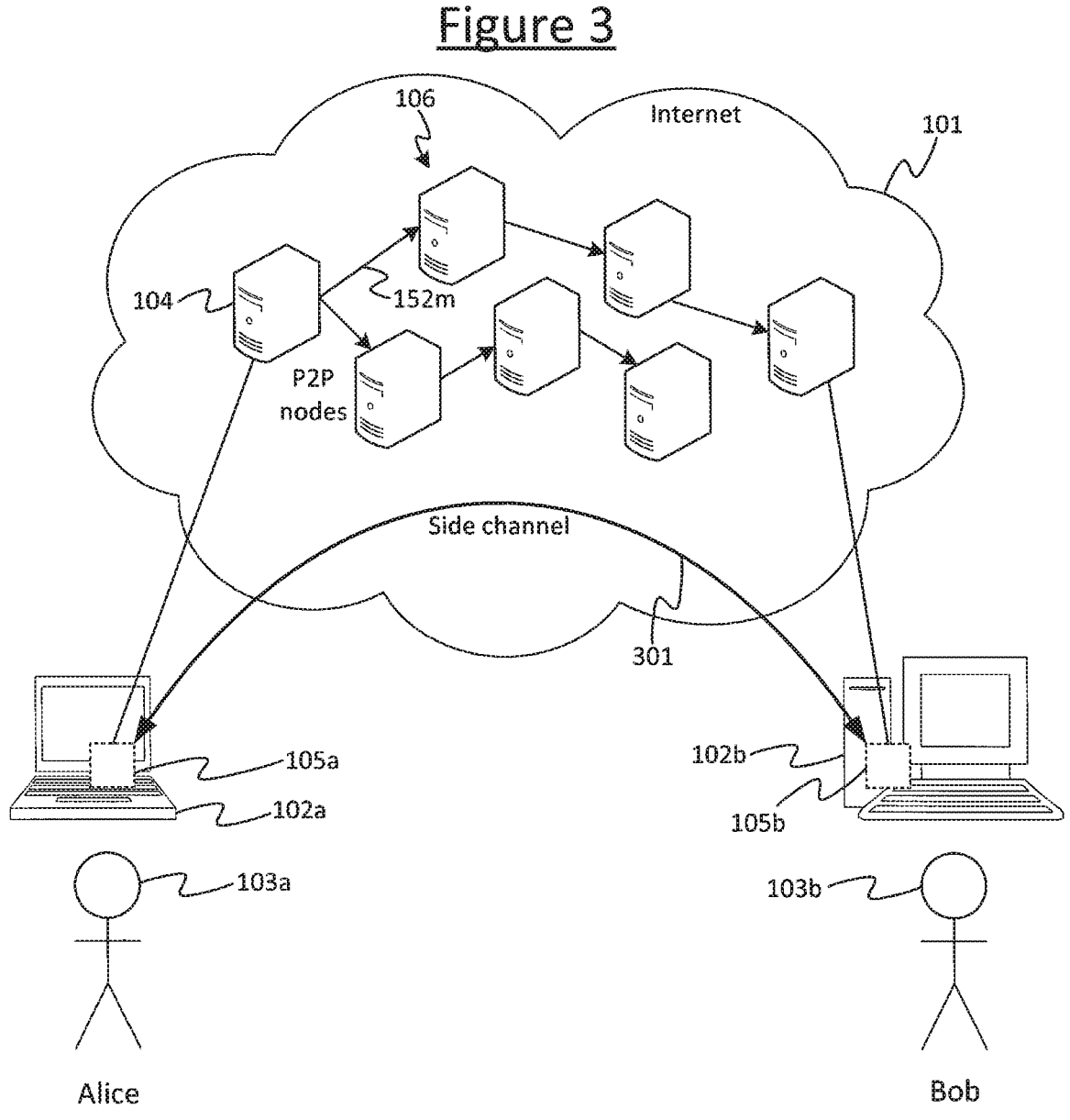
FIG. 3 is a schematic block diagram of another system for implementing a blockchain.

FIG. 3 shows a further system 100 for implementing a blockchain 150. The system 100 is substantially the same as that described in relation to FIG. 1 except that additional communication functionality is involved. The client application on each of Alice and Bob's computer equipment 102a, 120b, respectively, comprises additional communication functionality. That is, it enables Alice 103a to establish a separate side channel 301 with Bob 103b (at the instigation of either party or a third party). The side channel 301 enables exchange of data separately from the P2P network. Such communication is sometimes referred to as "off-chain". For instance this may be used to exchange a transaction 152 between Alice and Bob without the transaction (yet) being published onto the network P2P 106 or making its way onto the chain 150, until one of the parties chooses to broadcast it to the network 106. Alternatively or additionally, the side channel 301 may be used to exchange any other transaction related data, such as keys, negotiated amounts or terms, data content, etc.

The side channel 301 may be established via the same packet-switched network 101 as the P2P overlay network 106. Alternatively or additionally, the side channel 301 may be established via a different network such as a mobile cellular network, or a local area network such as a local wireless network, or even a direct wired or wireless link between Alice and Bob's devices 102a, 102b. Generally, the side channel 301 as referred to anywhere herein may comprise any one or more links via one or more networking technologies or communication media for exchanging data "off-chain", i.e. separately from the P2P overlay network 106. Where more than one link is used, then the bundle or collection of off-chain links as a whole may be referred to as the side channel 301. Note therefore that if it is said that Alice and Bob exchange certain pieces of information or data, or such like, over the side channel 301, then this does not necessarily imply all these pieces of data have to be send over exactly the same link or even the same type of network.

Client Software

Figure 4A:
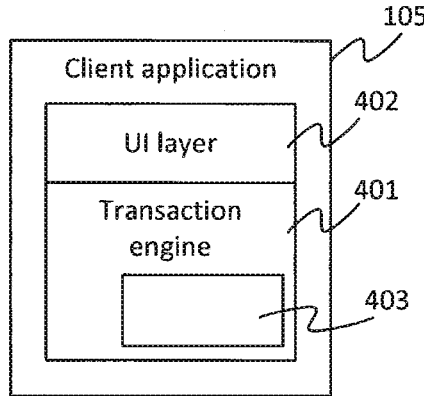
FIG. 4A is a schematic block diagram of a client application.

FIG. 4A illustrates an example implementation of the client application 105 for implementing embodiments of the presently disclosed scheme. The client application 105 comprises a transaction engine 401 and a user interface (UI) layer 402. The transaction engine 401 is configured to implement the underlying transaction-related functionality of the client 105, such as to formulate transactions 152, receive and/or send transactions and/or other data over the side channel 301, and/or send transactions to be propagated through the P2P network 106, in accordance with the schemes discussed above and as discussed in further detail shortly. In accordance with embodiments disclosed herein, the transaction engine 401 of each client 105 comprises a function 403 for generating a transaction comprising one or more single-use tokens.

The UI layer 402 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note: whilst the various functionality herein may be described as being integrated into the same client application 105, this is not necessarily limiting and instead they could be implemented in a suite of two or more distinct applications, e.g. one being a plug-in to the other or interfacing via an API (application programming interface). For instance, the functionality of the transaction engine 401 may be implemented in a separate application than the UI layer 402, or the functionality of a given module such as the transaction engine 401 could be split between more than one application. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Figure 4B:
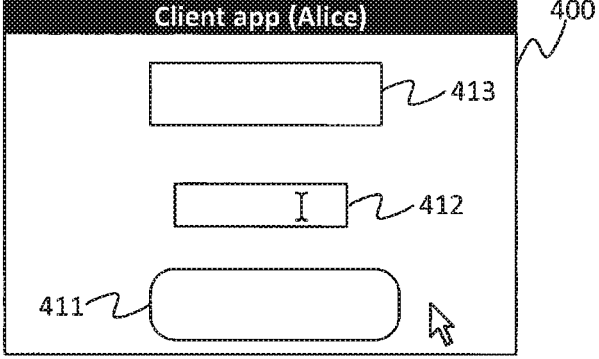
FIG. 4B is a schematic mock-up of an example user interface that may be presented by the client application of FIG. 4A.

FIG. 4B gives a mock-up of an example of the user interface (UI) 400 which may be rendered by the UI layer 402 of the client application 105a on Alice's equipment 102a. It will be appreciated that a similar UI may be rendered by the client 105b on Bob's equipment 102b, or that of any other party.

By way of illustration FIG. 4B shows the UI 400 from Alice's perspective. The UI 400 may comprise one or more UI elements 411, 412, 413 rendered as distinct UI elements via the user output means.

For example, the UI elements may comprise one or more user-selectable elements 411 which may be, such as different on-screen buttons, or different options in a menu, or such like. The user input means is arranged to enable the user 103 (in this case Alice 103a) to select or otherwise operate one of the options, such as by clicking or touching the UI element on-screen, or speaking a name of the desired option (N.B. the term "manual" as used herein is meant only to contrast against automatic, and does not necessarily limit to the use of the hand or hands). The options enable the user (Alice) to generate a transaction having a single-use token, and to define the rules, terms and/or conditions of the token.

Alternatively or additionally, the UI elements may comprise one or more data entry fields 412, through which the user can generate a token transaction. These data entry fields are rendered via the user output means, e.g. on-screen, and the data can be entered into the fields through the user input means, e.g. a keyboard or touchscreen. Alternatively the data could be received orally for example based on speech recognition.

Alternatively or additionally, the UI elements may comprise one or more information elements 413 output to output information to the user. E.g. this/these could be rendered on screen or audibly.

It will be appreciated that the particular means of rendering the various UI elements, selecting the options and entering data is not material. The functionality of these UI elements will be discussed in more detail shortly. It will also be appreciated that the UI 400 shown in FIG. 4B is only a schematized mock-up and in practice it may comprise one or more further UI elements, which for conciseness are not illustrated.

Node Software

Figure 5:
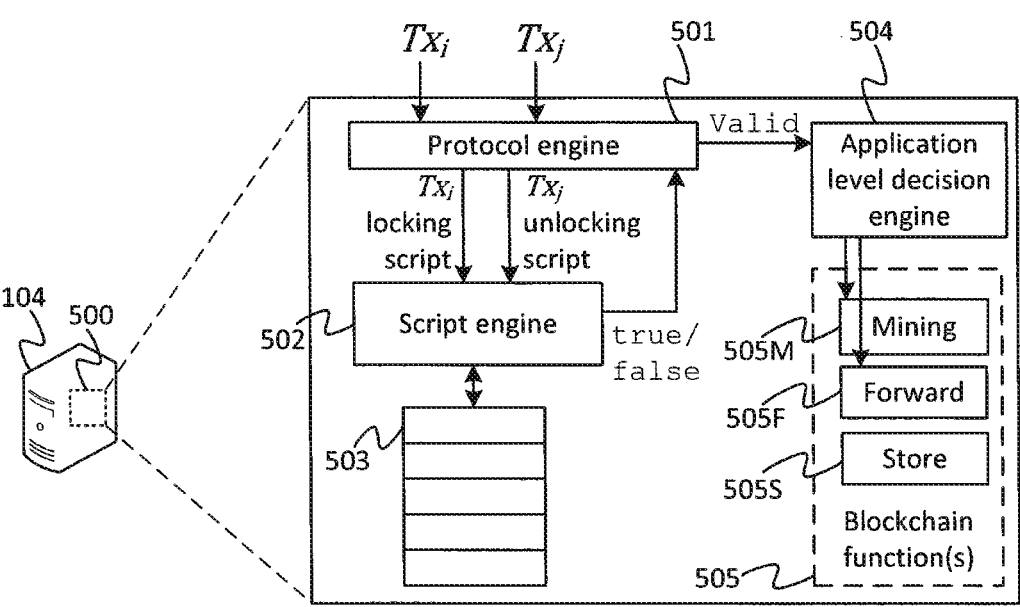
FIG. 5 is a schematic block diagram of some node software for processing transactions.

FIG. 5 illustrates an example of the node software 500 that is run on each node 104 of the P2P network 106, in the example of a UTXO- or output-based model. The node software 500 comprises a protocol engine 501, a script engine 502, a stack 503, an application-level decision engine 504, and a set of one or more blockchain-related functional modules 505. At any given node 104, these may include any one, two or all three of: a mining module 505M, a forwarding module 505F and a storing module 505S (depending on the role or roles of the node). The protocol engine 401 is configured to recognize the different fields of a transaction 152 and process them in accordance with the node protocol. When a transaction 152j (Tx$_1$) is received having an input pointing to an output (e.g. UTXO) of another, preceding transaction 152i (Tx$_{m-1}$), then the protocol engine 501 identifies the unlocking script in Tx$_1$ and passes it to the script engine 502. The protocol engine 501 also identifies and retrieves Tx$_i$ based on the pointer in the input of Tx$_1$. It may retrieve Tx$_i$ from the respective node's own pool 154 of pending transactions if Tx$_i$ is not already on the blockchain 150, or from a copy of a block 151 in the blockchain 150 stored at the respective node or another node 104 if Tx$_i$ is already on the blockchain 150. Either way, the script engine 501 identifies the locking script in the pointed-to output of Tx$_i$ and passes this to the script engine 502.

The script engine 502 thus has the locking script of Tx$_i$ and the unlocking script from the corresponding input of Tx$_1$. For example, transactions labelled Tx$_0$ and Tx$_1$ are illustrated in FIG. 2, but the same could apply for any pair of transactions. The script engine 502 runs the two scripts together as discussed previously, which will include placing data onto and retrieving data from the stack 503 in accordance with the stack-based scripting language being used (e.g. Script).

By running the scripts together, the script engine 502 determines whether or not the unlocking script meets the one or more criteria defined in the locking script—i.e. does it "unlock" the output in which the locking script is included? The script engine 502 returns a result of this determination to the protocol engine 501. If the script engine 502 determines that the unlocking script does meet the one or more criteria specified in the corresponding locking script, then it returns the result "true". Otherwise it returns the result "false".

In an output-based model, the result "true" from the script engine 502 is one of the conditions for validity of the transaction. Typically there are also one or more further, protocol-level conditions evaluated by the protocol engine 501 that must be met as well; such as that the total amount of digital asset specified in the output(s) of Tx$_1$ does not exceed the total amount pointed to by its inputs, and that the pointed-to output of Tx$_i$ has not already been spent by another valid transaction. The protocol engine 501 evaluates the result from the script engine 502 together with the one or more protocol-level conditions, and only if they are all true does it validate the transaction Tx$_1$. The protocol engine 501 outputs an indication of whether the transaction is valid to the application-level decision engine 504. Only on condition that Tx$_1$ is indeed validated, the decision engine 504 may select to control one or both of the mining module 505M and the forwarding module 505F to perform their respective blockchain-related function in respect of Tx$_1$. This may comprise the mining module 505M adding Tx$_1$ to the node's respective pool 154 for mining into a block 151, and/or the forwarding module 455F forwarding Tx$_1$ to another node 104 in the P2P network 106. Note however that in embodiments, while the decision engine 504 will not select to forward or mine an invalid transaction, this does not necessarily mean that, conversely, it is obliged to trigger the mining or the forwarding of a valid transaction simply because it is valid. Optionally, in embodiments the application-level decision engine 504 may apply one or more additional conditions before triggering either or both of these functions. E.g. if the node is a mining node 104M, the decision engine may only select to mine the transaction on condition that the transaction is both valid and leaves enough of a mining fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model (not illustrated in FIG. 4), a result of "true" could be indicated by a combination of an implicit, protocol-level) validation of a signature by the node 104 and an additional affirmative output of a smart contract (the overall result being deemed to signal true if both individual outcomes are true).

Single-Use Tokens

Figure 6:
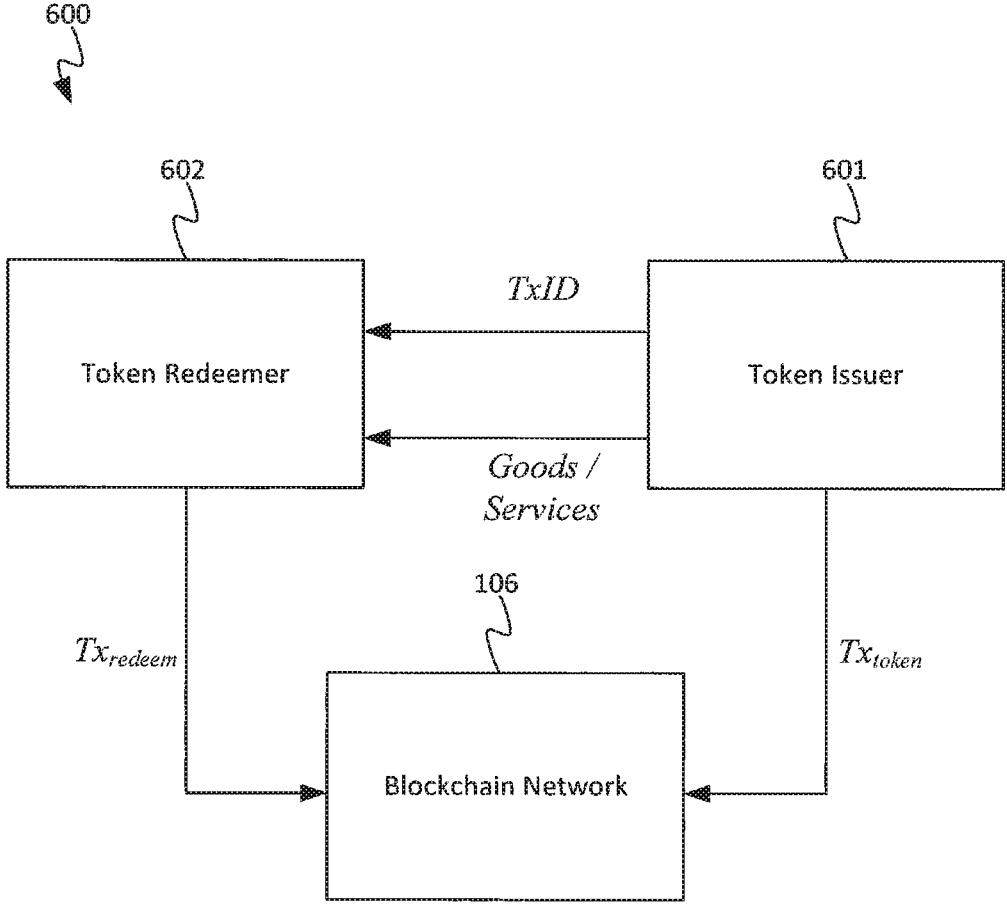
FIG. 6 is a schematic block diagram of a system for implementing single-use tokens on a blockchain.

FIG. 6 illustrates an example system 600 for implementing embodiments of the present invention which provide for a method of issuing single use tokens using blockchain transactions. As shown, a token issuer 601 generates a token transaction TX$_{token}$, and transmits the token transaction Tx$_{token}$ to the blockchain network 106 to be recorded in the blockchain 150. The token transaction Tx$_{token}$ comprises at least one output that includes a single-use token, i.e. data representing a single-use token. The token transaction TX$_{token}$ also includes an input containing a signature of the token issuer 601, i.e. a digital signature generated based on a private key corresponding to the token issuer's public key. The signature signs one, some, or all of the outputs that include a single-use token. A token redeemer 602 generates a redemption transaction Tx$_{redeem}$ which redeems the single-use token in the token transaction TX$_{token}$, and transmits the redemption transaction $Tx_{redeem}$ to the blockchain network 106 to be recorded in the blockchain 150.

The token issuer 601 may be the same party referred to as Alice 103a with reference to FIGS. 1 to 3. That is, the token issuer 601 may operate computer equipment 102a which runs client application 105a, and may perform any operations attributed to Alice 103a. Similarly, the token redeemer 602 may be the same party referred to as Bob 103a with reference to FIGS. 1 to 3. That is, the token redeemer 602 may operate computer equipment 102b which runs client application 105b, and may perform any operations attributed to Bob 103b.

In some examples, as shown in FIG. 6, the token issuer 601 is a party that issues the token redeemer 602 with a tangible asset in return for redeeming the single-use token. For example, the token issuer 601 may be a supplier of goods and/or services, and the token redeemer 602 may be a customer of that supplier. The token issuer 601 issues the token redeemer with the token, and when the token redeemer 602 uses the token, the token issuer 601 gives the token redeemer 602 something in return.

In other examples, the token issuer 601 is a party that issues the token redeemer 602 with an intangible asset in return for redeeming the single-use token. The single-use token may represent ownership of the intangible asset. For example, the single-use token may represent ownership of a vote, which the token redeemer 602 may cast by redeeming the single-use token via the redemption transaction $TX_{redeem}$.

In some examples, the token redeemer 602 may provide a third party (not shown in FIG. 6) with an asset when the single-use token is used. For example, the third party may provide the token redeemer 602 with information (e.g. a transaction identifier TxID of the token transaction) that is required for redeeming the single-use transaction, and in return, the token redeemer 602 provides that third party with goods or services. An advantage of this is that the redemption transaction acts as an immutable record of the third party receiving the goods or services.

The token transaction contains one or more single-use tokens. Each single-use token is included in a separate output of the token transaction, and each single-use token is associated with a separate spendable output of the token transaction. Therefore when the token transaction is sent to nodes of the blockchain network 106 and recorded in the blockchain 150, each single-use token is linked to a separate unspent transaction output (UTXO). A UTXO-based blockchain natively has the property of single-use transactions. The mining nodes are incentivised to ensure that there is no double spending of transactions. Therefore, any token that is linked to a UTXO cannot be used more than once.

The token (i.e. the token data) may be encrypted. For example, the token data may be encrypted using a private key of the token issuer 601 or the token redeemer 602, or a common secret known to both the token issuer 601 and the token redeemer 602. Alternatively, the token may be a hash of the token data.

There are two methods for linking (or associating) tokens to UTXOs. First, the single-use token may be embedded within an unspendable output of the token transaction, e.g. an OP_RETURN payload. An unspendable output cannot be spent, i.e. unlocked. This first method indirectly links, or associates, a token with a UTXO. The following table illustrates a token transaction that embeds a single-use token within an unspendable output.

| $TxID_{token}$ | | | |
|---|---|---|---|
| Version | 1 | Locktime | 0 |
| In-count | 1 | Out-count | 2 |

| Input list | | | Output list | |
|---|---|---|---|---|
| Outpoint | Unlocking script | Sequence number | Value | Locking script |
| Outpoint | < Sig >< PK > | 0xFFFFFFFF | x | [some locking script] |
| | | | 0 | OP_FALSE OP_RETURN < Token Data > |

The token issuer 601 can generate the transaction and issue a token. The transaction has at least one input and two outputs. The first output is a spendable output. The status of the first output represents the validity of the single-use token. If the first output is spent, then the token is considered to be used. If the first output is unspent, then the token is still valid for use. The output can be identified as $TXID_1\|0$. The second output is an unspendable output that contains all the information for the token. For example, the token issuer 601 may put the terms and conditions for the token in the second output.

The input, or more precisely, the signature in the input, links the two outputs. The token issuer 601 may sign the transaction to acknowledge that the first output is associated with (i.e. linked with) the second output.

One example of "[some locking script]" may be:

$$OP\_HASH256 < h_1 > OP\_EQUALVERIFY[P2PKH\ P_A]$$

where $h_1$ is the hash value of the OP_RETURN payload and $P_A$ is the public key of a token redeemer 602 or a third party. The inclusion of a hash puzzle in the locking script reinforces the linkage between the token and the UTXO.

The token issuer 601 may issue the token redeemer 602 with a transaction identifier of the token transaction.

Secondly, the single-use token may be embedded within a spendable output of the token transaction. Therefore the token is directly associated with a spendable output in that the token is included within that spendable output. For example, the token may be positioned between OP_PUSHDATA and OP_DROP opcodes. Opcodes are operation codes which operate on data included within a locking script or unlocking script of a transaction. For instance, an opcode may push (i.e. add) data to a stack (e.g. an alternate stack), drop (i.e. remove) data from a stack, or perform a function (e.g. add, subtract, hash, etc.) on data on the stack. The skilled person will be familiar with opcodes per se. The second method directly links the single-use token with a UTXO. Unlike the first method (i.e. linking a token with an unspendable output), the level of linkage is at an output level instead of a transaction level. The following table illustrates a token transaction that embeds a single-use token within a spendable output.

| TxID$_{token}$ | | | |
|---|---|---|---|
| Version | 1 | Locktime | 0 |
| In-count | 1 | Out-count | 1 |

| Input list | | | Output list | |
|---|---|---|---|---|
| Outpoint | Unlocking script | Sequence number | Value | Locking script |
| Outpoint | < Sig >< PK > | 0xFFFFFFFF | x | < Token Data > OP_DROP [some locking condition] |

This particular example transaction has one input and one output. The output contains information about the token in the locking script. The input contains the signature from the token issuer 601 that acknowledges the linkage between the token and the UTXO. As before, if the UTXO is spent, then the token is used and cannot be used again. If the UTXO is not spent, then the token is still valid for use.

One example for a locking script is given below:

<Token Data>OP_DROP[1-out-2 MultiSig$K_{issuer}$-PK$_A$]

The last part of the locking script is to allow either the token issuer 601 or the token redeemer 602 to spend the UTXO. When the token redeemer 602 uses the token, he or she is expected to spend the UTXO to reflect the usage or redemption of the token. The token issuer 601 can also be the party to spend the UTXO to indicate that the token has been used or revoked. More advanced locking scripts can be used to fit scenarios of different requirements.

The token issuer 601 may issue the token redeemer 602 with a transaction identifier of the token transaction. The token issuer 601 may also provide an identifier of a particular output of the token transaction.

In these embodiments, a single token transaction can include multiple single-use tokens. That is, the token transaction may include multiple spendable outputs that each contain a single-use token. Each token is associated with the spendable output (UTXO) which it is included within. Therefore the validity of a given token only depends on the output being in the UTXO set, i.e. whether or not the output has been spent.

One, some or all of the spendable outputs associated with a single-use token (whether it includes a single-use token or not) may be locked to a public key of the token issuer 601 and/or a public key of the token redeemer 602. For example, a spendable output may be a pay-to-public-key-hash (P2PKH) output locked to a public key of the token issuer 601, or to a public key of the token redeemer 602, or to a public key of a third party. A P2PKH output includes a hash of public key (a public key hash) and requires an input of the redemption transaction to include the public key that hashes to the public key hash, along with a signature generated using that public key, not necessarily in that order. Alternatively, a spendable output may be a multi-signature output which is locked to one or both of the respective public keys of the token issuer 601 and token redeemer 602. A multi-signature output is an n-of-m output which includes a total of m public keys and requires an input of the redemption transaction to include at least n signatures that correspond to (i.e. is generated based on a private key corresponding to) a public key in the multi-signature output. The same public key may be included in the output more than once.

In some examples, a spendable output may include a hash of the single-use token. In embodiments where the token transaction comprises multiple tokens, each spendable output may include a hash of its respective token. The spendable outputs may require the input of the redemption transaction to include the pre-image of the hash, i.e. the token data.

In some examples, the token issuer 601 may be the only party to sign the token transaction. For instance, the token issuer 601 includes a single input that signs the entire transaction. As another example, the token issuer may include multiple signatures within a single input. Each signature may have a different signature flag, i.e. each signature may sign a different number of inputs and/or outputs, and therefore sign a different message. A signature flag indicates what parts of the transaction the signature signs. The default is SIGHASH_ALL, which signs all parts of the transaction. The unsigned parts of the transaction may be modified. SIGHASH_NONE signals that the signature only signs the inputs, allowing anyone to add or change the outputs. SIGHASH_SINGLE signals that the signature signs all of the inputs and a corresponding output, i.e. a signature in the first input signs the first output.

The token issuer 601 may also include multiple inputs, each of which signs a separate output. The token issuer 601 may instead include multiple inputs, with one signing one input and one signing all inputs. Different signature flags may be used to sign different parts of the transaction, as discussed below.

If the token issuer 601 includes multiple signatures in the token transaction (whether they are included in the same input or different inputs), the signatures may be generated based on public keys which are linked to each other. For example, a second public key may be generated based on a first public key, e.g. a certified public key, with the first and second public keys being used (or rather the corresponding private keys) to generate the multiple signatures, i.e. a first signature based on the first public key and a second signature based on the second public key. Alternatively, the second public key may be generated by adding a first public key to a third public key (e.g. a certified public key), with the first and second public keys being used (or rather the corresponding private keys) to generate the multiple signatures.

In other examples, the token issuer 601 may include one or more inputs that sign the token transaction, and a different party (e.g. a second token issuer) may also include one or more inputs that sign the token transaction. For instance, the second token issuer may authorise the first token issuer 601 to issue tokens by way of signing the token transaction.

The second, different token issuer may generate a token transaction template which includes, in an input, a signature of the second token issuer. The second token issuer may then send the template transaction to the first token issuer 601 who adds an input including a signature of the first token issuer 601.

In order to update or cancel a single use token, the token issuer 601 may generate an update or cancel transaction respectively. An input of the update or cancel transaction references the output associated with the token to be updated or cancelled, and includes the necessary data to unlock the referenced output, e.g. a signature, pre-image, etc. If the token is to be updated, the update transaction comprises an updated single-use token. If the token is to be cancelled, the cancel transaction comprises data signalling that the token has been cancelled.

Example Use Case 1-Medical Prescriptions

The following describes how medical prescriptions can be issued on-chain to achieve traceability as well as patient confidentiality.

Main Actors
  Patient
  Prescriber
  Pharmacist
  Trusted Authority
  Medical Database (Medical_DB)
Main Stages
  Prescriber registers her credentials
  Prescriber signs prescription transaction (i.e. a token transaction)
  Patient redeems prescription/Pharmacist dispenses prescription
  Prescriber cancels or modifies prescription
Requirements
  1. Patient identity confidentiality: public and non-authorised actors should not be able to link the patient ID with the prescription.
  2. Patients may have the right to rectify or erase their personal identifiable information.
  3. Prescriber should be able to check the patient's identity.
  4. Prescriptions should be issued by an authorised prescriber only. Pharmacists and auditors should be able to check the authorisation.
  5. Authorised system actors should be able to access the patient's prescription history in a secure manner.
  6. A drug use database or a remaining stock database should be able to be checked and excessive use should be detected.
  7. Actors such as prescribers, pharmacists and patients should be authenticated and authorised accordingly.
  8. Authorised prescribers should be able to modify/cancel a prescription that has not been dispensed or redeemed yet.
  9. Prescriptions should be dispensed by authorised pharmacists only.
  10. Prescribers could send prescriptions directly to the patient's nominated pharmacy without patient involvement in the communication.

Figure 7:
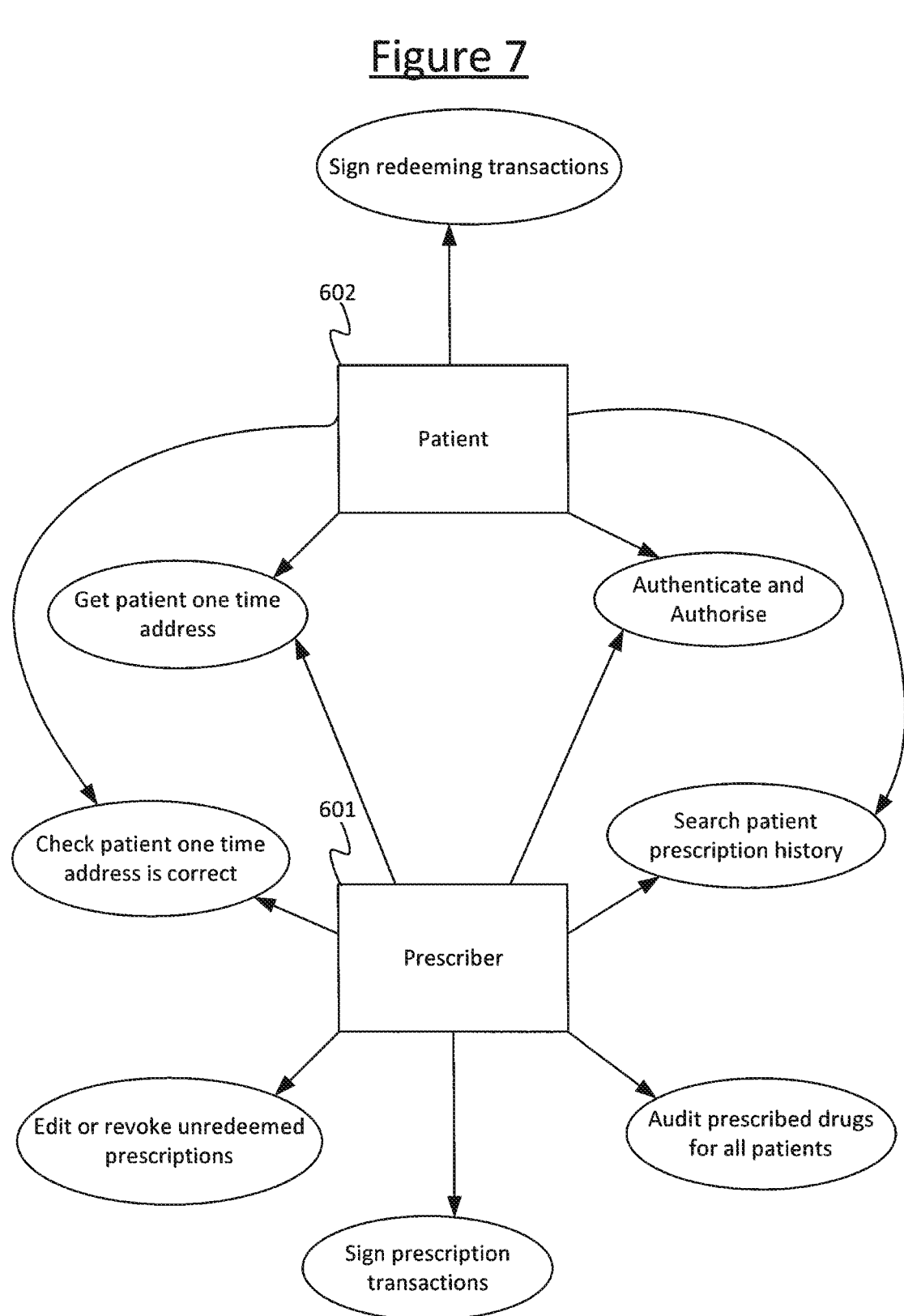
FIG. 7 is a schematic representation of the requirements of an example system for issuing prescriptions to patients.

The requirements of the example system are shown in FIG. 7.

Normally prescription data includes personal identifying information (PII). A typical prescription may include:
  Patient name, DOB, address
  Drug name and quantity
  Notes for patient and for pharmacist
  Date of prescription
  Prescriber's name Uploading prescription data on the blockchain would benefit from the availability, immutability and transparency features of the blockchain data storage in general. Most important is the ability of the blockchain to prevent double spending. No personal identifying information (PII) should be kept on a public permission-less blockchain. Patient confidentially is also another important legal requirement, which means only authorised access is given to PII. A solution that meets these requirements is to store only part of the prescription data, which is non-PII, on the blockchain. This has the following features
  1) PII such as patient name, DOB and address are not stored on the blockchain
  2) Prescription data that is non-PII such as drug name and quantity, and date of prescription are stored on chain
  3) Patient's wallet can use different receiving addresses for different transactions, i.e. one-time address POTA
  4) The link between the patient identity and their transaction addresses is kept off chain on a trusted server. When a pharmacist or a prescriber need to authenticate the patient's ID, they need to check if the address comes from the patient's wallet. The trusted server would then identify and/or authenticate patients to authorized actors.

This would meet all the use case requirements while having a system that provides auditability, availability and integrity. In addition, a trusted authority may carry out the following tasks
  1. Register users (including patients, prescribers, and pharmacists). This includes carrying out identification, authentication, and authorization checks.
  2. Manage users' public key certificates. This includes signing, updating and revoking certificates that maps user identities and roles to their public keys, certificates that provide users authorised scope, for e.g. (drugs that they are allowed to prescribe), and certificates for hospitals and other entities such as the Medical_DB.
  3. Controls access to data that maps between patients' identities and their wallet addresses. This data is stored in the Medical_DB.

The Medical_DB 802 is a secure database which is managed by the trusted authority 801. The Medical_DB carries out the following functionalities
  1. Store the link between a patient's identity and their public keys. This includes storing a patient's PII and the patient's history of transactions.
  2. Perform prescription checks during transaction prescription formation. These include checking
    a. Prescribers authorisations
    b. Patient identification and authentication
    c. Patient's medical history.
  3. If the prescription passes checks, the Medical_DB 802 co-signs the prescription transaction with the prescriber 601.
  4. Interact with the blockchain to extract patient's medical history.

Figure 8:
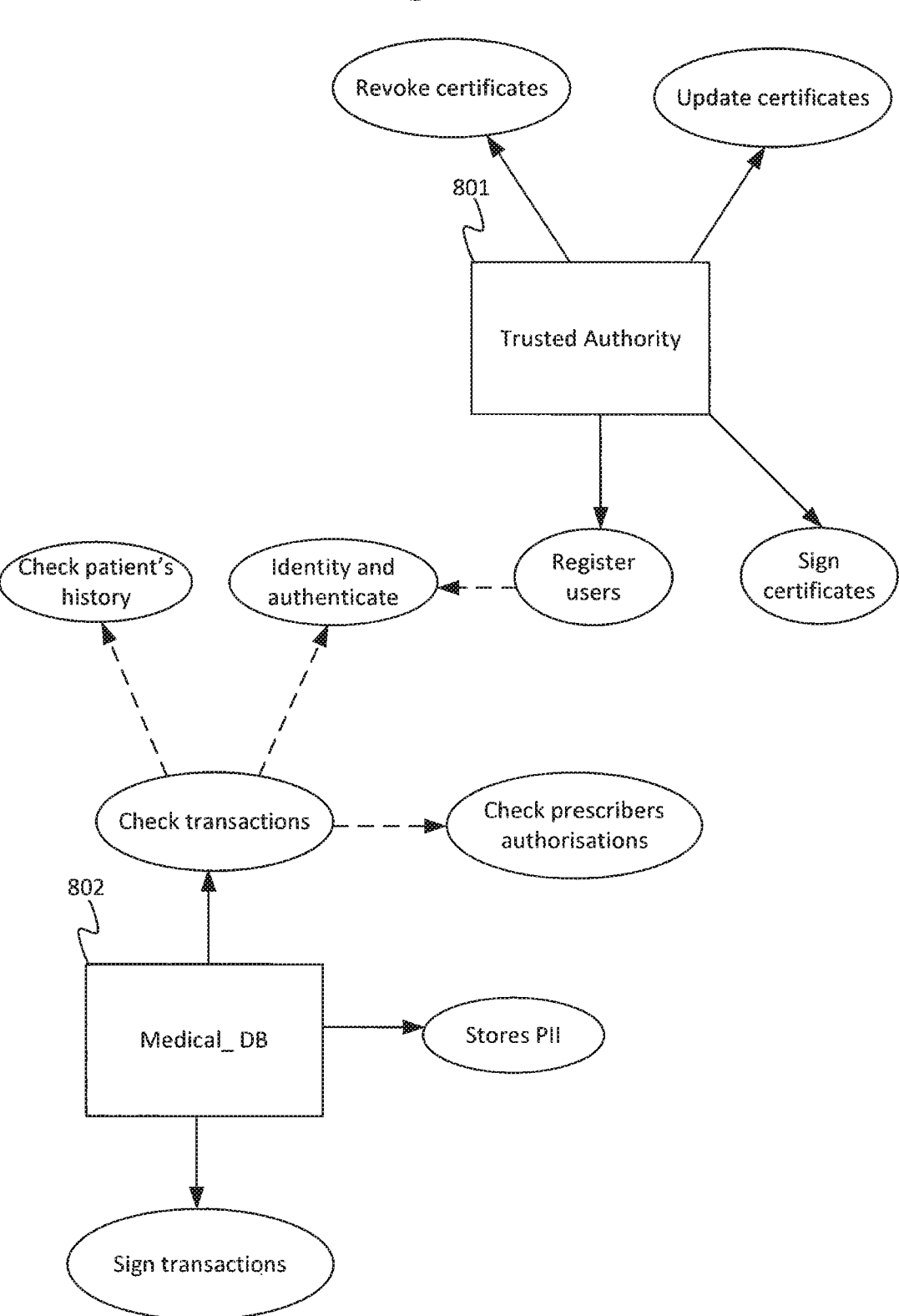
FIG. 8 is a schematic representation of the roles of a trusted authority and a medical database in an example system for issuing prescriptions to patients.

A use case diagram for the trusted authority and the Medical_DB 802 is shown in FIG. 8.

Figure 9:
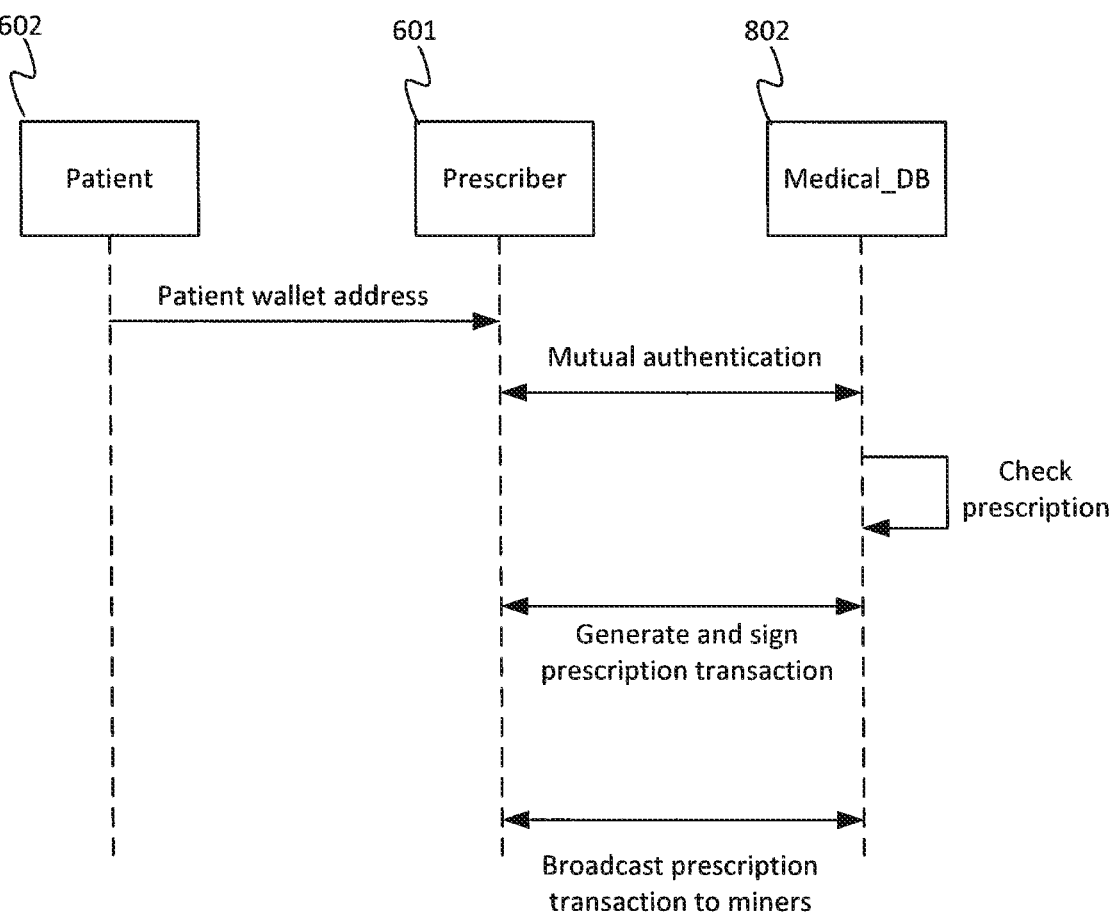
FIG. 9 is an example sequence diagram for a prescriber 601 to issue a prescription to a patient.
Figure 10:
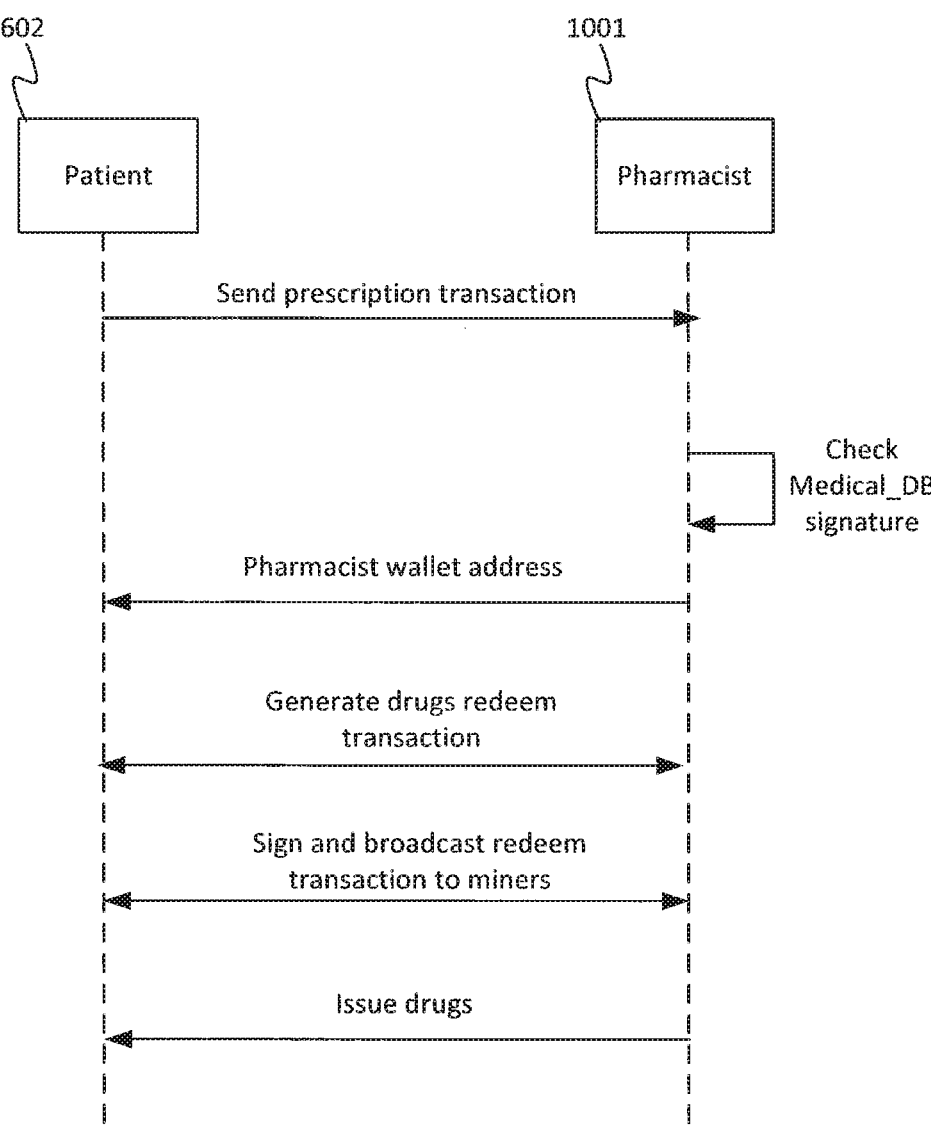
FIG. 10 is an example sequence diagram for a patient to redeem a prescription with a pharmacist.

The described system allows authorised actors different actions according to their roles and attributes. This is effectively an attribute-based access control model. For example:
  Prescribers can search patients history
  Prescribers can check patients identification and run authentication checks
  Prescribers can create and sign prescription transactions
  Patients can check their prescription history
  Patients can co-sign redeem transactions FIGS. 9 and 10 illustrate example sequence diagrams for a prescriber (token issuer 601) and Medical_DB 802 issuing a prescription to a patient 602. In this example, the Medical_DB 802 is assumed to be a trusted authority that authenticates the prescriber 601 and co-signs the prescription transaction with the prescriber 601. The patient (token redeemer 602) redeems the prescription and the pharmacist dispenses prescription. That is, the patient 602 collects the prescription by spending the prescription transaction (the token transaction).

In more detail and as shown in FIG. 9, the prescriber 601 first obtains a wallet address from the patient 602. After authenticating with the Medical_DB 802 and having the prescription checked and verified, the prescriber 601 and the Medical_DB, 802 generate the prescription transaction (equivalent to the token transaction) which includes a single-use prescription. Both the prescriber 601 and the Medical_DB 802 include a respective signature in the transaction. The prescriber 601 then submits the prescription transaction to the blockchain.

As shown in FIG. 10, the patient 602 provides the pharmacist 1001 with the prescription transaction which includes the prescription. The pharmacist checks the signature of the Medical_DB 802. The pharmacist 1001 provides the patient 602 with a wallet address, and the patient 602 then generates a redemption transaction which is sent to the pharmacist's wallet address. The pharmacist 1001 may also sign the redemption transaction. The patient 602 or pharmacist 1001 submit the redemption transaction to the blockchain, and in return, the pharmacist provides the patient 602 with the prescription drugs.

In some examples, the prescriber (token issuer 601) may need to register with a trusted authority, e.g. an on-chain certificate authority (CA) 801 that registers prescribers and authorises them to sets of allowed drugs. There are different ways such a system can be realized using the blockchain. A CA 801 authenticates and authorizes prescribers' certificates in a transaction $\text{TxID}_{CTX\text{-}PK_A}$. A certificate's keys are valid as long as its transaction $\text{Tx}_1$ $D_{CTX\text{-}PK_A}$ output is unspent. Updating and revoking a certificate is done by spending the transaction output.

For a prescriber Alice 601 to have her wallet certified, she performs the following:
1. Alice registers a public key $$P_{CA}^A$$

with a CA. and is issued with a digital certificate. Alice may freely broadcast $$P_{CA}^A.$$

Preferably she will never create a signature using $$P_{CA}^A.$$

2. Using a deterministic wallet design, she creates child keys $$P_{A1} = P_{CA}^A + P_1'$$

$$P_{A2} = P_{CA}^A + P_2'$$

$$\vdots$$

Here $$P_1', P_2', \ldots$$

are deterministic keys based on a seed known only to Alice. The private keys are also related $$sk_{A1} = sk_{CA}^A + sk_1'.$$

Note that the summation of public keys involves elliptic curve point addition, and not normal addition, since $P_{Ai}$ and $$P_i',$$

are elliptic curve points. Whereas the summation of private keys involves normal addition since $sk_{Ai}$ and $$sk_i',$$

are integers, e.g. as described in the ECDSA.
3. Alice issues prescription transactions using $P_{A1}$, $P_{A2}$, . . . by signing transactions. She only ever uses one signature per public key, $P_{Ai}$.
4. By signing messages using $P_{Ai}$ and $$P_i',$$

and given that $$P_{Ai} = P_{CA}^A + P_i',$$

Alice proves that she knows the private key $$sk_{CA}^A,$$

without using $$sk_{CA}^A$$

in signing. Note the message signed by $$P_i'$$

must be a different message to that signed by $P_{Ai}$. The two signatures for $P_{Ai}$ and $$P_i'$$

prove that Alice knows the private key corresponding to $$P_{CA}^A.$$

Alice only requires one public key to be certified by the CA. All other keys can be provably linked.

$$P_{CA}^A$$

can be freely broadcast to the network. It is never used to sign a transaction.

Digital signatures that are linkable to a public key in a public key certificate are referred to below as linkable signatures. A signer uses linkable signatures to sign a message using two digital signatures, whose public keys are $P_{Ai}$ and $$P_i'$$

as described above. A set of linkable digital signatures can be in the form of:

Two separate transaction inputs; one for $P_{Ai}$ and the other for $$P_i'.$$

The two input locking scripts can be a standard P2PK, or P2PKH [P2PKH $P_A$], as shown in $Tx_1$ $D_2$.

A single transaction input that contains the two signatures. See $Tx_1$ $D_3$. The locking script format can be [P2PKH $P_{Ai}$ P2PKH $P_i'$] as follows OP_DUP OP_HASH160<hash of $P_{Ai}$> OP_EQUALVERIFY OP_CHECKSIGVERIFY OP_DUP OP_HASH160 < Hash of $P_i'$ > OP_EQUALVERIFY OP_CHECKSIG

| TxID₂ | | | |
|---|---|---|---|
| Inputs | | Outputs | |
| Value | Script | Value | Script |
| x BSV | < Sig $PA_1$ ><SIGHASH_ALL>> <$PA_1$> | y | [some locking script] |
| z BSV | < Sig $P_1'$ > < SIGHASH_SINGLE >> < $P_1'$ > | 0 | OP_RETURN [certificate transaction id] |

| TxID₃ | | | |
|---|---|---|---|
| Inputs | | Outputs | |
| Value | Script | Value | Script |
| x BSV | < Sig $PA_1$ ><SIGHASH_ALL>> <$PA_1$> < Sig $P_1'$ > < SIGHASH_SINGLE >> < $P_1'$ > | y BSV 0 BSV | [some locking script] OP_RETURN [certificate transaction id] |

Preferably the SIGHASH flag should not be the same in the two OP_CHECKSIGs, otherwise this can compromise the signer's private key in implementations where secure random key generators are not properly implemented.

In the following, the term linkable signatures refers to one of the above forms. A certificate transaction $Tx_1$ $D_{CTX-PK_A}$ may be generated by a trusted authority as follows.

| TxID$_{CTX-PKA}$ | | | |
|---|---|---|---|
| Inputs | | Outputs | |
| Value | Script | Value | Script |
| x BSV | [Trusted Authority linkable signatures] | y BSV | UTXO Registration: OP_DUP HASH160 < $PK_{CA}^{Issue}$ > OP_EQUALVERIFY OP_CHECKSIG |
| | | 0 BSV | X.509 Digital Certificate: OP_RETURN < CA ≪ $P_{CA}^A$ ≫ > |

An example prescription transaction that references the registration transaction is shown below.

| TxID$_{prescription-1}$ | | | |
|---|---|---|---|
| Inputs | | Outputs | |
| Value | Script | Value | Script |
| x BSV | [prescriber linkable signatures] | y 0 | [locking script spendable by patient signature or prescriber linkable signature] OP_RETURN Certificate flag> [Signers' certificates references] <Token Issuer identifying address> Prescription flag> <Drug code> <Drug quantity> <Notes> |

A prescriber Alice signs TxID$_{prescription-1}$ using a pair of linkable signatures. Alice inserts a reference to her valid $Tx_1$ $D_{CTX-PK_A}$ in OP_RETURN output. She also inserts prescription data.

The first output of the TxID$_{prescription-1}$ is spent by the patient when redeeming the prescription or it is spent by the prescriber when revoking it. To check if TxID$_{prescription-1}$ is signed by an authorised prescriber, a party (e.g. a pharmacist) performs the following:

1. Check that $Tx_1$ $D_{CTX-PK_A}$ output is signed by a trusted authority and is unspent.

2. Check that $$P_{Ai} = P_{CA}^{A} + P_i'$$

An example of [locking script spendable by patient signature or prescriber linkable signature] can be:

$<m=1><P_A><P_{POTA}><n=2>$ OP_CHECKMULTISIGVERIFY where $<P_{POTA}>$ is the one time address of the patient 602 and $P_A$ belongs to the prescriber.

An example of [locking script spendable by patient signature or prescriber linkable signature] can be:

IF

OP_DUP OP_HASH160<hash of $P_{Ai}$> OP_EQUAL-VERIFY OP_CHECKSIGVERIFY OP_DUP

OP_HASH160 < Hash of of $P_i'$ > OP_EQUALVERIFY OP_CHECKSIG

ELSE

OP_DUP OP_HASH160<Hash of $P_{POTA}$> OP_EQUAL-VERIFY OP_CHECKSIG ENDIF where $P_{Ai}$ are $$P_i'$$

belong to the prescriber 601.

The prescription transaction may also be generated with an extra trusted authority signature (i.e. a second, different token issuer). The prescription transaction is signed by a prescriber 601 and a trusted entity, referred to as a "Medical DB" 802. In this example, the prescriber's signature may not be known to the pharmacist to verify. The pharmacist may therefore depend on the Medical_DB signature to check that the prescription is signed by an authorised prescriber. This scenario is the one described in FIGS. 9 and 10. In general, the Medical_DB signature can be used to prove any of the following:

the transaction is prescribed by an authorized prescriber the transaction prescription is redeemable the patient is authenticated the patient medical history has been checked Then a prescription transaction can be given by

| | | | TxID$_{prescription-2}$ | |
|---|---|---|---|---|
| Input | | Output | | |
| Index | Unlocking script | Index | Value | Locking script |
| 0 | [prescriber's linkable signatures] | 0 | y | [locking script spendable by patient or prescriber] |
| 1 | [Medical_DB's linkable signatures] | 1 | 0 | OP_RETURN Certificate flag> [Signers certificates references] <Token Issuer identifying address> Prescription flag> <Drug code> <Drug quantity> <Notes> |
| | | 2 | Change | [locking script spendable by Medical_DB] (optional) |
| | | 3 | Change | [locking script spendable by prescriber] (optional) |

The token issuer's identifying address allows the pharmacist 1001 to identify the token issuer/or trusted authority. This allows the pharmacist 1001 to check that the prescription is authorized by that entity. Either the prescriber 601 or the patient can spend TXID$_{prescription}$||0. The prescriber 601 spends it to cancel or update the prescription, and the patient 602 spends it to redeem it.

When a patient 602 redeems his prescription transaction from a pharmacist, a redeem transaction is created. One of its inputs would be the spendable output in the TXID$_{prescription}$||0. The redeeming transaction may be signed by the patient 602 and the pharmacist. Note that the patient 602 does not sign using linkable signatures to preserve her privacy. The following transaction may be produced.

| | | TxID$_{redeem}$ | | | |
|---|---|---|---|---|---|
| | Input | | | Output | |
| Index | Output | Unlocking script | Index | Value | Locking script |
| 0 | TxID$_{prescription}$ ‖ 0 | [patient signature] | 0 | Change | [locking script spendable by pharmacist] |
| 1 | Any UTXO | [pharmacist linkable signature] | 1 | 0 | OP_RETURN Prescription flag> <Certificate flag> [Signers certificates references] <Redeem prescription> <Pharmacist Identifying address> <Token Issuer address> <Drug code> <Drug quantity> <Notes> |

If the prescription transaction assumes an on-chain CA, the pharmacist would need to check that:

1. Check that signers certificate references in the prescription transaction (i.e. Tx$_1$ D$_{CTX\text{-}PK_A}$) output is signed by a trusted authority and is unspent.
2. Check that $$P_{A1} = P_{CA}^A + P_1'$$

Sometimes a prescription transaction may need to be cancelled or updated. Assuming token data is embedded in the non-spendable transaction output (using OP_RETURN), then prescription cancelling or updating is done by spending the spendable output of the transaction TxID$_{prescription}$‖0.

Prescription cancellation is achieved when the prescription transaction TxID$_{prescription}$‖0 is spent, and a flag "cancel" in the output of the spending transaction confirms the cancellation of prescription.

Prescription change can be achieved by spending TxID$_{prescription}$‖0 with a flag "update" in the output of the spending transaction. The new prescription is inserted in the output. For a transaction with a flag "update" to be accepted for redemption, it has to be signed by a prescriber's linkable signatures and co-signed by the Medical_DB linkable signatures.

If the token data is embedded in a spendable output, then cancelation and updating are achieved by spending that output.

It is also possible to have one transaction for both prescribing and dispensing of drugs. In this scenario the prescriber 601 can sign a transaction using the SIGHASH flags Single I AnyoneCanPay. The transaction is then passed off-chain to the patient 602. When dispensing the drugs, the pharmacist's wallet address is added to the output. The pharmacist will also have to sign the transaction, hence add their own input. This transaction might require interaction between the pharmacist 1001 and the prescriber 601. It is also possible to have the patient 602 nominate a pharmacy of their choice, to which prescriptions are sent directly. The benefit of such arrangement is that the pharmacy can have enough time to order and prepare the prescription and managing supplies more timely.

This use case leverages the blockchain to provide a system for recording prescriptions that is auditable, available and immutable. Blockchain data is readily accessible by anyone and anyone can download the blockchain. Prescriptions can be easily identified within the blockchain because of the use of prescription flags. Combining these two points means that prescription metadata can be monitored from a single set of records by anyone without unnecessary barriers or permission. Auditing 'Classified drugs' usage is a particular motivator for the need to have auditability, but the protocol enables auditability of all prescriptions.

The described examples have the following features.

Drugs names and quantities and their dates of prescription can be audited without having the patient's identity.

Drugs (classified or not) can be linked to the prescriber's identity and/or the medical institute that authenticated and authorized the prescriber 601 in a non-refutable manner.

By combining the off-chain PII patient data, it is possible to allow controlled access to authorized person to check the patient's prescription history. These checks can be vital in case of emergencies, and in cases that the patient's medical condition do not allow specific types of prescriptions.

Prescribers can be checked against the drugs they have been issuing, and whether they are authorized to issue such drugs.

Patients can be identified and authenticated in a privacy friendly manner by the prescribers and pharmacists and any other authorised actors. This is done without risking their personal data being accessible on the public domain.

The Medical_DB that co-signs prescriptions with the prescribers guarantees that: 1) the prescriber 601 is qualified and authorised, 2) the patient is identified and authenticated adequately, and 3) the patient prescription history is checked against the signed transaction prescription. The Medical_DB 802 would have its own checks audited. The transparency of the system ensures any misconfiguration or misbehaviour can be detected and traced to its source.

Policies can be automated and the system is configured to trace and flag and raise alarms in case of violations.

Policies can be automated to be enforced during issuing prescriptions, such as black listing pregnant patients and patients with some conditions from specific drugs, unless extra signature from an authorised prescriber 601 is needed, and/or black listing drugs from being administered more than certain quantities, or being combined with other drugs.

The system described can be used to provide drugs tracking from the supplier, who supplies drugs to the pharmacy, all the way to the patient 602. This proposes the following.

When a new drug shipment arrives, the drug supplier (token issuer) and the pharmacist (second token issuer) will issue a transaction $Tx_1$ $D_{supply}$ (token transaction). $Tx_1$ $D_{supply}$ is signed by both of them using linkable signatures.

The transaction $Tx_1$ $D_{supply}$ will include data (token data) about the drug code and quantity that is received by the pharmacist.

The transaction spendable output is spendable by the pharmacist signature using a redemption transaction.

The drug stock kept by a pharmacist can be calculated at any time by subtracting the drug quantity in the $Tx_1$ $D_{supply}$ from the quantity in the $TxID_{redeem}$.

Example Use Case 2-Parking

Suppose a car park manager, Charlie, (token issuer 601) would like to issue parking tokens to customers. The first step is for Charlie to create a list of parking tokens using one of the two methods above, i.e. including a token in a spendable or unspendable output. Without loss of generality, the following examples use a token transaction that has tokens in spendable outputs.

| TxID$_3$ | | | | |
|---|---|---|---|---|
| Version | 1 | Locktime | 0 | |
| In-count | 1 | Out-count | n | |
| | Input list | | Output list | |
| Outpoint | Unlocking script | Sequence number | Value | Locking script |
| Outpoint | < Sig >< PK > | 0xFFFFFFFF | x | < Token Data > OP_DROP [P2PKH PK$_C$] |
| | | | x | < Token Data > OP_DROP [P2PKH PK$_C$] |
| | | | . . . | . . . |
| | | | x | < Token Data > OP_DROP [P2PKH PK$_C$] |

If Alice would like to park her car for 10 hours, Charlie creates the following transaction (a redemption transaction):

| TxID$_4$ | | | | |
|---|---|---|---|---|
| Version | 1 | Locktime | 10 hours | |
| In-count | 1 | Out-count | 1 | |
| | Input list | | Output list | |
| Outpoint | Unlocking script | Sequence number | Value | Locking script |
| TXID$_3$ || 0 | < Sig$_c$ >< PK$_C$ > | 0x00000001 | x | <h$_4$> [some locking script] | where $TXID_3\|0$ represents one of the parking tokens Charlie has created, and $h_4$ is the hash value of Alice's car registration number. Charlie can add a time stamp to make the hash value unique every time.

When Alice presents this transaction at the exit, the gate keeper will perform the following:

1. check the outpoint referenced in the input is unspent, 2. check the validity of the signature in the input, 3. check the hash value of the car registration number matches the hash value in the output, and 4. create a new version (with max sequence number) of the transaction to charge Alice's actual parking time.

Note that if Alice parked more than 10 hours, then $TXID_4$ would become valid and accepted by miners before Alice leaves the car park. This will cause check 1 to fail. If Alice parked less than 10 hours, then $TXID_4$ is invalid due to its locktime. Hence, the outpoint referenced in the input is still unspent (check 1 passes). If both check 2 and 3 are fine, then the gate keeper creates the final transaction:

| TxID'$_4$ | | | | |
|---|---|---|---|---|
| Version | 1 | | Locktime | 0 |
| In-count | 1 | | Out-count | 1 |
| | Input list | | | Output list |
| Outpoint | Unlocking script | Sequence number | Value | Locking script |
| TXID$_3$ || 0 | < SigC > < PKC > | 0xFFFFFFFF | x | <hA> [some locking script] |

The above transaction assumes Alice pays the parking fee via other means. However, the payment may be integrated into the parking token system by adding one more input from Alice in Tx$_1$ D$_4$.

| TxID$_4$ | | | | |
|---|---|---|---|---|
| Version | 1 | | Locktime | 10 hours |
| In-count | 2 | | Out-count | 2 |
| | Input list | | | Output list |
| Outpoint | Unlocking script | Sequence number | Value | Locking script |
| TXID$_3$ || 0 | < Sig$_c$ >< PK$_C$ > | 0x00000001 | y | <h$_A$> [some locking script] |
| Alice's outpoint | < Sig$_A$ >< PK$_A$ > | 0x00000001 | z | [Alice's change address] |

| TxID'$_4$ | | | | |
|---|---|---|---|---|
| Version | 1 | | Locktime | 0 |
| In-count | 2 | | Out-count | 2 |
| | Input list | | | Output list |
| Outpoint | Unlocking script | Sequence number | Value | Locking script |
| TXID$_3$ || 0 | < SigC > < PKC > | 0xFFFFFFFF | y' | <hA> [some locking script] |
| Alice's outpoint | < SigA > < PKA > | 0xFFFFFFFF | z' | [Alice's change address] |

In the first of the two transactions, Alice pays the parking fee for 10 hours. Later, if she parks for less than 10 hours, she still can update the transaction and only pays for the actual duration she has parked. It should be noted also that by having Alice signing TXID$_4$, that could be used to prove that Alice actually entered the parking lot at the mentioned time, which would be included in <h$_A$>. I.e. that could be used if Alice or Charlie want to dispute the time when she entered the parking lot.

CONCLUSION

It will be appreciated that the above embodiments have been described by way of example only. More generally there may be provided a method, apparatus or program in accordance with any one or more of the following Statements.

Statement 1: A computer-implemented method of using blockchain transactions to issue one or more single-uses tokens for use by one or more respective token redeemers, wherein the method is performed by a token issuer and comprises: generating a token transaction, wherein the token transaction comprises: one or more token outputs, wherein each token output comprises token data representing a respective single-use token, wherein each single-use token is associated with a respective spendable output of the token transaction, and wherein a respective validity of each single-use token is conditional on the respective spendable output being present in an unspent transaction output set of a blockchain; and one or more inputs, wherein at least a first one of the inputs comprises a signature linked to a first public key of the token issuer; and transmitting the token transaction to one or more nodes of a blockchain network to be recorded in the blockchain.

Statement 2: The method of claim 1, wherein the token transaction comprises a plurality of token outputs.

Statement 3. The method of statement 1 or statement 2, wherein each single-use token is associated with the respective spendable output in that each token output is the respective spendable transaction output.

Statement 4. The method of statement 3, wherein one or more of the one or more token outputs are m-of-n multi-signature outputs, and wherein each m-of-n multi-signature output is configured such that, in order to be unlocked by an input of a token redemption transaction, the input of the token redemption transaction must to comprise at least m signatures that are linked to respective ones of n public keys.

Statement 5. The method of statement 4, wherein each m-of-n multi-signature output requires the input of the token redemption transaction to comprise a signature that is linked to a second public key of a token redeemer and/or a signature that is linked to a public key of the token issuer.

The second public key may be the same as the first public key. Alternatively, the first and second public keys may be different public keys.

Statement 6. The method of any of statements 3 to 5, wherein one or more of the one or more token outputs comprise a respective if-else statement that defines two or more alternative conditions, and wherein each alternative condition is configured such that, in order to be unlocked by an input of a token redemption transaction, the input of the token transaction must meet the defined condition.

Statement 7. The method of statement 1, wherein the token transaction comprises a single token output, and wherein the token output is an unspendable output.

Statement 8. The method of statement 7, wherein the spendable output associated with the single-use token of the single token output is an m-of-n multi-signature output configured such that, in order to be unlocked by an input of a token redemption transaction, the input of the token redemption transaction must comprise a signature that is linked to a public key of a token redeemer and/or a signature that is linked to a second public key of the token issuer.

Statement 9. The method of any preceding statement, wherein the respective spendable output associated with the single-use token of the respective token output is a pay-to-public-key-hash output configured such that, in order to be unlocked by an input of a token redemption transaction, the input of the token redemption transaction must comprise a public key of a token redeemer and/or a second public key of the token issuer.

Statement 10. The method of statement 9, the respective spendable output associated with the single-use token of the respective token output comprises a hash of the token data representing that single-use token.

Statement 11. The method of any preceding statement, wherein the token transaction comprises a plurality of inputs, and wherein at least one of the plurality of inputs comprises a signature linked to a public key of a second, different token issuer.

Statement 12. The method of any preceding statement, wherein the token transaction comprises a plurality of inputs, wherein at least one of the plurality of inputs comprises a signature linked to a third public key of the token issuer, and wherein the first and third public keys are linked to each other.

Statement 13. The method of any preceding statement, wherein the first one of the inputs of the token transaction comprises a signature linked to the third public key of the token issuer, and wherein the first and third public keys are linked to each other.

Statement 14. The method of statement 12 or statement 13, wherein the first and third public keys are linked to a second public key of the token issuer.

Statement 15. The method of statement 14, wherein the second public key is a certified public key.

Statement 16. The method of any preceding statement, wherein the token transaction comprises a plurality of inputs, and wherein at least one of the plurality of token inputs comprises a signature linked to a public key of the token redeemer.

Statement 17. The method of any preceding statement, comprising: receiving a token transaction template from a second, different token issuer or the token redeemer; and generating the token transaction based on the token transaction template.

Statement 18. The method of any preceding statement, wherein the token data representing a respective single-use token comprises a reference to a certificate transaction comprising the first public key of the token issuer or a certified public key linked to the first public key of the issuer.

Statement 19. The method of any preceding statement, comprising: generating a token update transaction, wherein the token update transaction comprises an input that references one of the one or more token outputs of the token transaction, wherein the token update transaction comprises a token update output, wherein the token update output comprises token data representing an updated version of the respective single-use token of the referenced input of the token transaction; and transmitting the token update transaction to one or more nodes of a blockchain network to be recorded in the blockchain.

Statement 20. The method of any preceding statement, comprising: generating a token cancel transaction, wherein the token cancel transaction comprises an input that references one of the one or more token outputs of the token transaction, wherein the token cancel transaction comprises a token cancel output, wherein the token cancel output comprises token data representing a cancelled version of the respective single-use token of the referenced input of the token transaction; and transmitting the token cancel transaction to one or more nodes of a blockchain network to be recorded in the blockchain.

Statement 21. The method of any preceding statement, comprising: transmitting, to the token redeemer, a transaction identifier of the token transaction; and/or transmitting, to the token redeemer, a respective transaction output identifier of one or more respective spendable outputs associated with respective single-use tokens.

Statement 22. Computer equipment comprising: memory comprising one or more memory units; and processing apparatus comprising one or more processing units, wherein the memory stores code arranged to run on the processing apparatus, the code being configured so as when on the processing apparatus to perform the method of any of statements 1 to 21.

Statement 23. A computer program embodied on computer-readable storage and configured so as, when run on computer equipment of statement 22, to perform the method of any of statements 1 to 21.

Statement 24. A token transaction for a blockchain, the token transaction comprising: one or more token outputs, wherein each token output comprises token data representing a respective single-use token, wherein each single-use token is associated with a respective spendable output of the token transaction, and wherein a respective validity of each single-use token is conditional on the respective spendable output being present in an unspent transaction output set of a blockchain; and one or more inputs, wherein at least a first one of the inputs comprises a signature linked to a first public key of a token issuer.

Statement 25. A computer-readable storage medium having stored thereon the token transaction of statement 24.

According to another aspect of the teachings disclosed herein, there may be provided a method comprising the actions of the token issuer and the token redeemer.

According to another aspect of the teachings disclosed herein, there may be provided a system comprising the computer equipment of the token issuer and the token redeemer.

Other variants may become apparent to a person skilled in the art once given the disclosure herein. The scope of the present disclosure is not limited by the disclosed embodiments but only by the accompanying claims.

What is claimed is:

1. A computer-implemented method of using blockchain transactions to issue a single-use token for use by a token redeemer, wherein the method is performed by a token issuer and comprises:

receiving a blockchain address from the token redeemer, wherein the blockchain address comprises a public key linked to the redeemer or a hash of the public key linked to the redeemer;

generating token data representing the single-use token;

generating a cryptographic hash of the token data by inputting the token data to a cryptographic hash function and executing the cryptographic hash function using the token data;

generating a set of cryptographically-linked public keys, wherein the set comprises a first public key, a second public key and a third public key, and wherein the second public key is certified by a certificate authority as being linked to the token issuer;

receiving, from the certificate authority, a reference to a certificate transaction recorded on the blockchain, wherein the certificate transaction comprises a certificate certifying the second public key of the token issuer;

generating a token transaction, wherein generating the token transaction comprises:

generating a token output of the token transaction, including the cryptographic hash of the token data in the token output;

including, in the token output, the reference to a certificate transaction to enable the token redeemer to identify the certificate transaction and verify that the first and third public keys are cryptographically linked to the second public key that has been certified by the certificate authority;

locking the token output or a different output of the token transaction to the blockchain address of the token redeemer, said locking comprising constructing a locking script that requires, when executed during validation of the token transaction by one or more nodes of a blockchain network, an input of a redemption transaction to comprise a signature generated using a private key corresponding to the public key linked to the token redeemer; and generating one or more inputs of the token transaction, generating a first digital signature linked to the first public key of the token issuer, and including the first digital signature into one of the one or more inputs, generating a second digital signature linked to the third public key of the token issuer, and including the second digital signature into one of the one or more inputs; and transmitting the token transaction to one or more nodes of a blockchain network to be recorded in the blockchain.

2. The method of claim 1, wherein the token output is a spendable transaction output.

3. The method of claim 2, wherein the token output is an m-of-n multi-signature output, and wherein the m-of-n multi-signature output is configured such that, in order to be unlocked by the input of the token redemption transaction, the input of the token redemption transaction must comprise at least m signatures that are linked to respective ones of n public keys.

4. The method of claim 3, wherein the m-of-n multi-signature output requires the input of the token redemption transaction to comprise a signature that is linked to a second public key of a token redeemer and/or a signature that is linked to a public key of the token issuer.

5. The method of claim 2, wherein token output comprises a if-else statement that defines two or more alternative conditions, and wherein each alternative condition is configured such that, in order to be unlocked by the input of the token redemption transaction, the input of the redemption transaction must meet one of the two or more defined conditions.

6. The method of claim 1, wherein the token output is an unspendable output.

7. The method of claim 6, wherein the different output of the token transaction is a spendable output associated with the single-use token and is an m-of-n multi-signature output configured such that, in order to be unlocked by the input of the token redemption transaction, the input of the token redemption transaction must comprise a signature that is linked to a public key of a token redeemer and/or a signature that is linked to the second public key of the token issuer.

8. The method of claim 1, wherein the token transaction comprises a plurality of inputs.

9. The method of claim 1, comprising:

generating a token update transaction, wherein the token update transaction comprises an input that references the token output of the token transaction, wherein the token update transaction comprises a token update output, wherein the token update output comprises token data representing an updated version of the single-use token; and transmitting the token update transaction to one or more nodes of a blockchain network to be recorded in the blockchain.

10. The method of claim 1, comprising:

generating a token cancel transaction, wherein the token cancel transaction comprises an input that references of the token output of the token transaction, wherein the token cancel transaction comprises a token cancel output, wherein the token cancel output comprises token data representing a cancelled version of the single-use token; and transmitting the token cancel transaction to one or more nodes of a blockchain network to be recorded in the blockchain.

11. The method of claim 1, comprising:

transmitting, to the token redeemer, a transaction identifier of the token transaction.

12. The method of claim 1, wherein the single-use token is associated with a tangible asset.

13. Computer equipment, comprising:

memory comprising one or more memory units; and processing apparatus comprising one or more processing units, wherein the memory stores code arranged to run on the processing apparatus, the code being configured so as when run on the processing apparatus, the processing apparatus performs a method of using blockchain transactions to issue a single-uses tokens for use by a token redeemers, wherein the method is performed by a token issuer, the method including:

receiving a blockchain address from the token redeemer, wherein the blockchain address comprises a public key linked to the redeemer or a hash of the public key linked to the redeemer;

generating token data representing the single-use token;

generating an encrypted version of the token data by: a) inputting the token data to a cryptographic hash function and executing the cryptographic hash function using the token data;

generating a set of cryptographically-linked public keys, wherein the set comprises a first public key, a second public key and a third public key, and wherein the second public key is certified by a certificate authority as being linked to the token issuer;

receiving, from the certificate authority, a reference to a certificate transaction recorded on the blockchain, wherein the certificate transaction comprises a certificate certifying the first public key of the token issuer or the second public key of the token issuer;

generating a token transaction, wherein generating the token transaction comprises:

generating a token output of the token transaction, including the hash of the token data in the token output, including, in the token output, the reference to a certificate transaction to enable the token redeemer to identify the certificate transaction and verify that the first and third public keys are cryptographically linked to the second public key that has been certified by the certificate authority;

locking the token output or a different output of the token transaction to the blockchain address of the token redeemer, said locking comprising constructing a locking script that requires, when executed during validation of the token transaction by one or more nodes of a blockchain network, an input of a redemption transaction to comprise a signature generated using a private key corresponding to the public key linked to the token redeemer; and generating one or more inputs of the token transaction, generating a first digital signature linked to the first public key of the token issuer, and including the first digital signature into one of the one or more inputs, generating a second digital signature linked to the third public key of the token issuer, and including the second digital signature into one of the one or more inputs; and transmitting the token transaction to one or more nodes of a blockchain network to be recorded in the blockchain.

14. A computer program product, comprising computer program code embodied on a non-transitory computer-readable storage medium, the computer program code being configured so as, when run on computer equipment, the computer equipment performs a method of using blockchain transactions to issue a single-use token for use by a token redeemers, wherein the method is performed by a token issuer and includes:

receiving a blockchain address from the token redeemer, wherein the blockchain address comprises a public key linked to the redeemer or a hash of the public key linked to the redeemer;

generating token data representing the single-use token;

generating an encrypted version of the token data by: a) inputting the token data to a cryptographic hash function and executing the cryptographic hash function using the token data;

generating a set of cryptographically-linked public keys, wherein the set comprises a first public key, a second public key and a third public key, and wherein the second public key is certified by a certificate authority as being linked to the token issuer;

receiving, from the certificate authority, a reference to a certificate transaction recorded on the blockchain, wherein the certificate transaction comprises a certificate certifying the first public key of the token issuer or the second public key of the token issuer;

generating a token transaction, wherein generating the token transaction comprises:

generating a token output of the token transaction, including the hash of the token data in the token output, including, in the token output, the reference to a certificate transaction to enable the token redeemer to identify the certificate transaction and verify that the first and third public keys are cryptographically linked to the second public key that has been certified by the certificate authority;

locking the token output or a different output of the token transaction to the blockchain address of the token redeemer, said locking comprising constructing a locking script that requires, when executed during validation of the token transaction by one or more nodes of a blockchain network, an input of a redemption transaction to comprise a signature generated using a private key corresponding to the public key linked to the token redeemer; and generating one or more inputs of the token transaction, generating a first digital signature linked to the first public key of the token issuer, and including the first digital signature into one of the one or more inputs, generating a second digital signature linked to the third public key of the token issuer, and including the second digital signature into one of the one or more inputs; and transmitting the token transaction to one or more nodes of a blockchain network to be recorded in the blockchain.

* * * * *